United States Patent
Shin et al.

(10) Patent No.: US 9,983,720 B2
(45) Date of Patent: May 29, 2018

(54) TOUCHSCREEN DISPLAY DEVICE AND METHOD OF DRIVING THE SAME

(71) Applicant: LG Display Co., Ltd., Seoul (KR)

(72) Inventors: SeungRok Shin, Gyeonggi-do (KR); Sangkyu Kim, Gyeonggi-do (KR); Jeonghoon Lee, Gyeonggi-do (KR); Jeonghoon Lee, Incheon (KR)

(73) Assignee: LG Display Co., Ltd., Seoul (KR)

( * ) Notice: Subject to any disclaimer, the term of this patent is extended or adjusted under 35 U.S.C. 154(b) by 145 days.

(21) Appl. No.: 14/979,957

(22) Filed: Dec. 28, 2015

(65) Prior Publication Data

US 2016/0188097 A1 Jun. 30, 2016

(30) Foreign Application Priority Data

Dec. 26, 2014 (KR) ........................ 10-2014-0190501

(51) Int. Cl.
*G06F 3/044* (2006.01)
*G09G 3/20* (2006.01)
*G06F 3/041* (2006.01)

(52) U.S. Cl.
CPC ............ *G06F 3/0416* (2013.01); *G06F 3/044* (2013.01); *G06F 3/0412* (2013.01); *G09G 3/20* (2013.01);
(Continued)

(58) Field of Classification Search
CPC ...... G06F 3/0412; G06F 3/044; G06F 3/0416; G09G 2310/08; G09G 2320/0261;
(Continued)

(56) References Cited

U.S. PATENT DOCUMENTS 4,975,691 A * 12/1990 Lee .......................... G09G 3/30
315/169.3
9,547,390 B2 1/2017 Kim et al.
(Continued)

FOREIGN PATENT DOCUMENTS

CN 102945093 A 2/2013
CN 103943075 A 7/2014
(Continued)

OTHER PUBLICATIONS

Chinese Office Action dated Feb. 12, 2018 in the counterpart Chinese Patent Application No. 201511001506.5.

*Primary Examiner* — Bryan Earles
(74) *Attorney, Agent, or Firm* — Morgan, Lewis & Bockius LLP

(57) ABSTRACT

A disclosed touchscreen display device includes a display panel with data lines, gate lines, and N×M subpixels arranged in a matrix of N subpixel rows and M subpixel columns, and respectively connected to the corresponding data lines and the corresponding gate lines, where N and M are each a natural number greater than or equal to 2. The display device also includes touch electrodes. The display device is configured to provide a scanning signal to the gate lines connected to the N subpixel rows in a first sequence during an $i^{th}$ frame and in a second sequence different from the first sequence during an $(i+1)^{th}$ frame, where i is a positive integer. Each of the $i^{th}$ frame and the $(i+1)^{th}$ frame is configured to include at least one display driving mode section and at least one touch driving mode section.

20 Claims, 27 Drawing Sheets

(52) U.S. Cl.
CPC . *G09G 2310/08* (2013.01); *G09G 2320/0261* (2013.01); *G09G 2340/0435* (2013.01)

(58) Field of Classification Search
CPC .... G09G 2340/0435; G09G 3/20; G09G 3/28; G09G 3/32; G09G 3/36
See application file for complete search history.

(56) References Cited

U.S. PATENT DOCUMENTS

| | | | | |
|---|---|---|---|---|
| 2004/0227743 | A1* | 11/2004 | Brown | G02F 1/13338 345/204 |
| 2010/0295804 | A1* | 11/2010 | Takeuchi | G02F 1/13338 345/173 |
| 2012/0044195 | A1* | 2/2012 | Nakanishi | G06F 3/0412 345/174 |
| 2012/0050240 | A1 | 3/2012 | Tanaka et al. | |
| 2014/0320446 | A1 | 10/2014 | Kim et al. | |
| 2015/0378472 | A1* | 12/2015 | Hekstra | G06F 3/044 345/17 |

FOREIGN PATENT DOCUMENTS

| | | |
|---|---|---|
| CN | 104133601 A | 11/2014 |
| KR | 20120078099 A | 7/2012 |

* cited by examiner

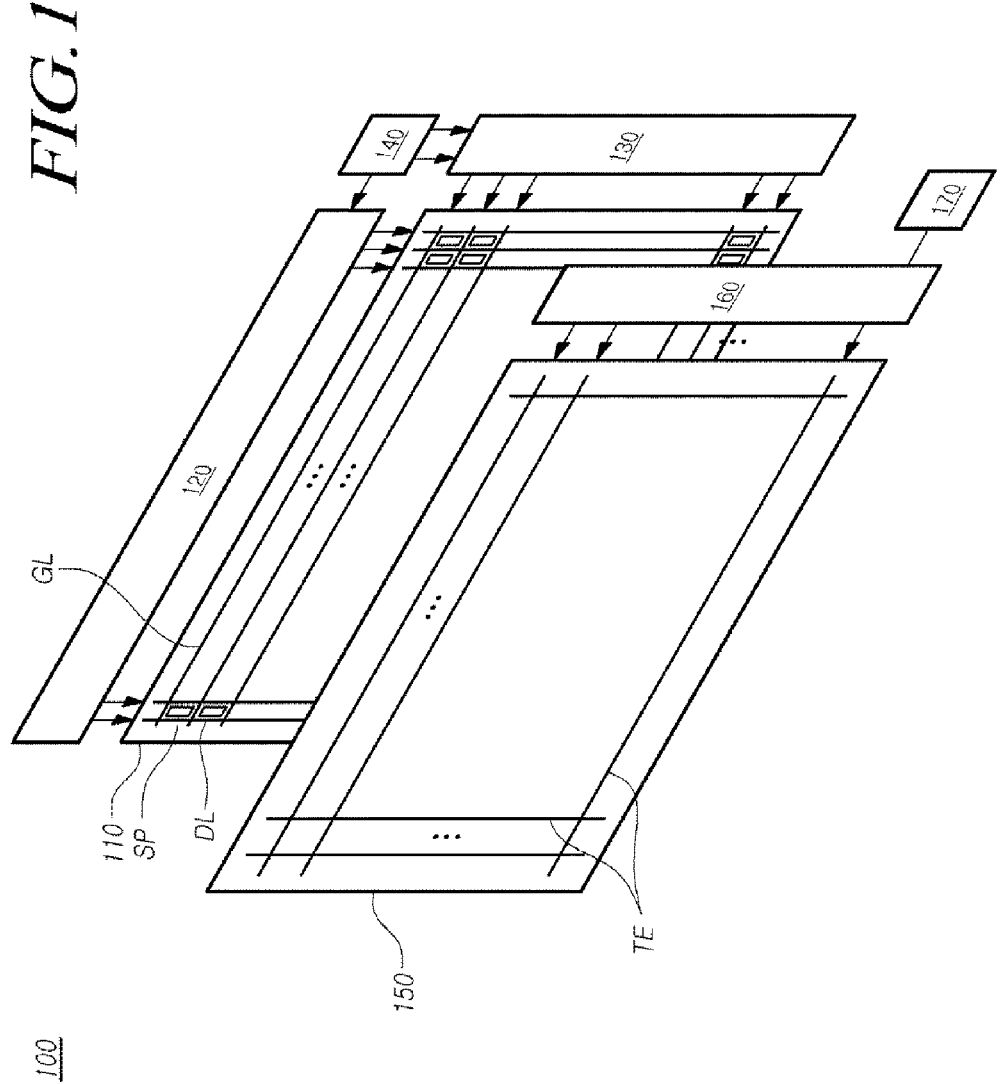

EXTERNAL TOUCH PANEL 150
110

INTEGRAL TOUCH PANEL 150
110

TOUCHSCREEN DISPLAY DEVICE AND METHOD OF DRIVING THE SAME

This application claims priority from and the benefit of Korean Patent Application Number 10-2014-0190501 filed on Dec. 26, 2014, which is hereby incorporated by reference for all purposes as if fully set forth herein.

BACKGROUND

Field of the Invention

The present invention relates to a display device, and more particularly to, a touchscreen display device and a method of driving the same.

Discussion of the Related Art

In response to the development of the information society, there is an increasing demand for various types of display device capable of displaying images. Currently, various display devices, such as liquid crystal display (LCD) devices, plasma display panels (PDPs) and organic light-emitting diode (OLED) display devices, are in common use.

Certain display devices are able to provide a touch-based user interface enabling users to intuitively and conveniently directly input data or instructions to the devices, without having to use conventional input systems, such as buttons, a keyboard, or a mouse. Such display devices with a touch-based input system alternately perform display driving to display images and touch driving to enable touch sensing by dividing a single frame into multiple sections.

Since a single frame is divided into multiple display driving mode sections instead of being driven as a single section in a display driving mode, the entire area of the screen is divided into two or more partial areas while displaying an image. Thus, a user may visually recognize abnormalities in images at the boundaries of divided sections of the image.

SUMMARY

Accordingly, the present invention is directed to a touchscreen display device and a method of driving the same that substantially obviate one or more of the problems due to limitations and disadvantages of the related art.

An object of the present invention is to provide a touchscreen display device and a method of driving the same that are capable of effectively preventing or mitigating viewable abnormalities in video images at boundary lines when the entire area of a screen is divided into multiple partial areas as a single frame is alternately driven by being divided into two or more display driving mode sections and one or more touch driving mode sections.

Another object of the present invention is to a touchscreen display device and a method of driving the same that are capable of effectively preventing or mitigating the same abnormality in a video image from repeatedly appearing for a prolonged period when the entire area of a screen is divided into multiple areas as a single frame is alternately driven by being divided into two or more display driving mode sections and one or more touch driving mode sections.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a touchscreen display device comprises: a display panel comprising a plurality of data lines, a plurality of gate lines, and N×M subpixels arranged in a matrix having N subpixel rows and M subpixel columns, and respectively connected to the corresponding data lines and the corresponding gate lines, wherein N and M are each a natural number greater than or equal to 2; a data driver configured to provide data voltages to the data lines in a display driving mode; a gate driver configured to provide a scanning signal to the gate lines in the display driving mode; and a touch driver configured to provide a touch driving signal to at least one of a plurality of touch electrodes in a touch driving mode, wherein the gate driver is configured to provide the scanning signal to the gate lines connected to the N subpixel rows in a first sequence during an $i^{th}$ frame and in a second sequence different from the first sequence during an $(i+1)^{th}$ frame, where i is a positive integer, and wherein each of the $i^{th}$ frame and the $(i+1)^{th}$ frame is configured to include at least one display driving mode section and at least one touch driving mode section.

In another aspect, a method of driving a touchscreen display device with a display panel having a plurality of data lines, a plurality of gate lines, and N×M subpixels arranged in a matrix consisting of N subpixel rows and M subpixel columns and respectively connected to the corresponding data lines and the corresponding gate lines, wherein N and M are each a natural number greater than or equal to 2, and a plurality of touch electrodes, comprises: applying the scanning signal to the gate lines connected to the N subpixel rows in a first sequence during at least one display driving mode section of an $i^{th}$ frame; applying the touch driving signal to at least one of the touch electrodes during at least one touch driving mode section of the $i^{th}$ frame; and applying the scanning signal to the gate lines connected to the N subpixel rows in a second sequence different from the first sequence in an $(i+1)^{th}$ frame, wherein i is a positive integer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate example embodiments of the invention and together with the description serve to explain the principles of the invention. In the drawings:

FIG. 1 is a schematic configuration view illustrating a touchscreen display device according to example embodiments;

DETAILED DESCRIPTION OF EXAMPLE EMBODIMENTS

Figure 2A:
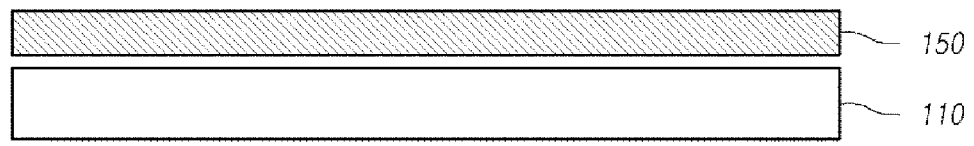
FIG. 2A and FIG. 2B illustrate two types of touch panels of the touchscreen display device according to the example embodiments.

Reference will now be made in detail to embodiments of the present invention, examples of which are illustrated in the accompanying drawings. Throughout this document, reference should be made to the drawings, in which the same reference numerals and signs will be used to designate the same or like components. In the following description of the example embodiments, detailed descriptions of known functions and components incorporated herein may be omitted.

Also, while such terms as "first," "second," "A," "B," "(a)," and "(b)" may be used herein to describe various elements, these terms are used only to distinguish one element from another element. Unless otherwise specified, they are not intended to denote a specific sequence, order or number of elements, and the substance, sequence, order or number of these elements is not limited by these terms. When an element is referred to as being "connected to" or "coupled to" another element, it encompasses not only being "directly connected" or "coupled to" the other element, but also being "indirectly connected" or "indirectly coupled to" the other element via an "intervening" element unless otherwise specified. In the same context, unless otherwise specified, when an element is referred to as being formed "on" or "under" another element, it encompasses not only being directly formed on or under another element, but also being indirectly formed on or under another element with one or more intervening elements between them.

Figure 2B:
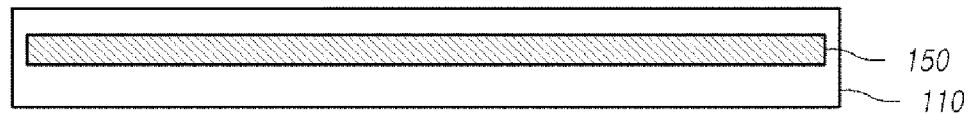
Figure 3:
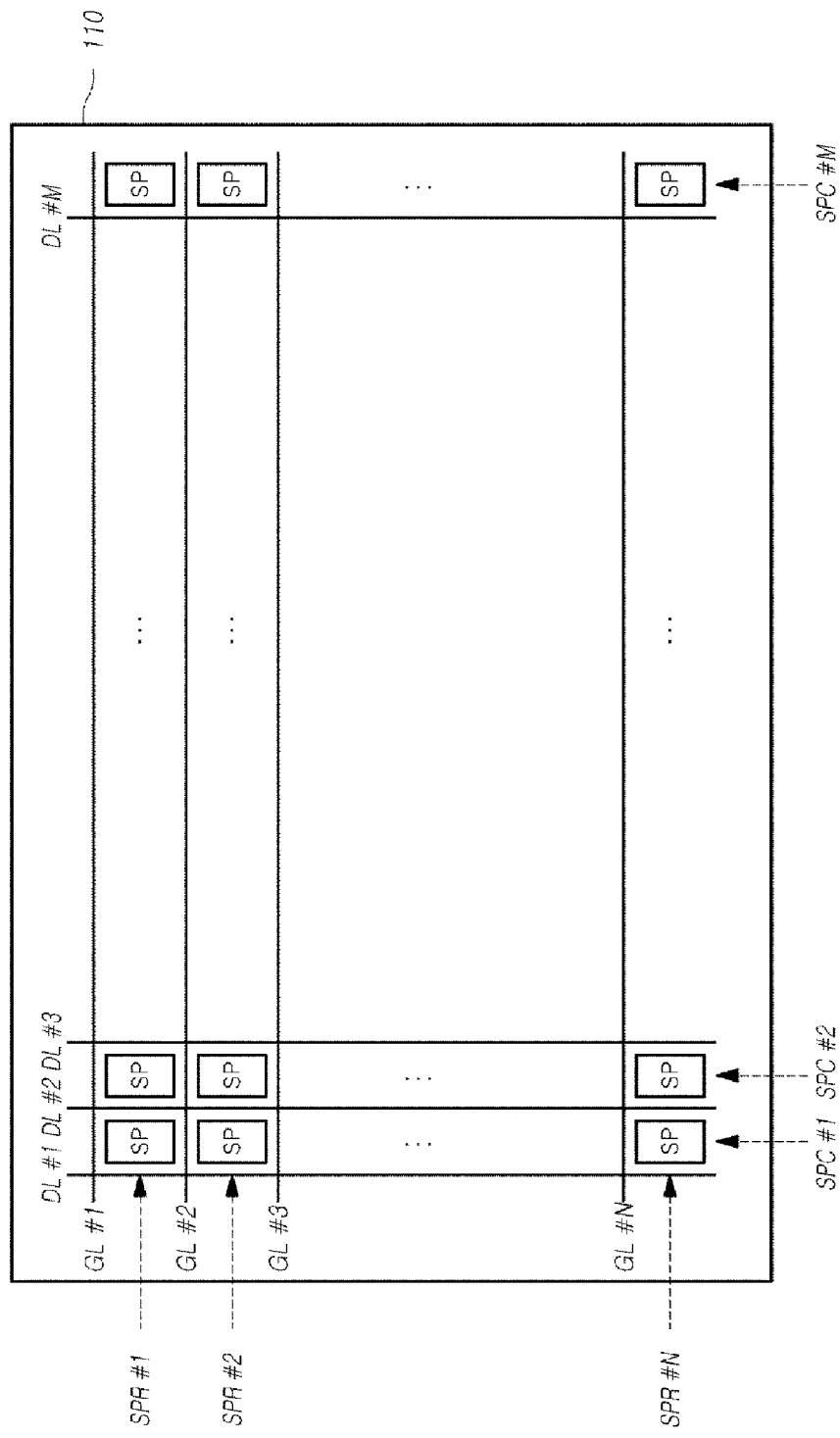
FIG. 3 is a plan view illustrating a display panel of the touchscreen display device according to the example embodiments.

First, with reference to FIGS. 1 to 3, the overall system configuration of a touchscreen display device 100 according to example embodiments are briefly described below. FIG. 1 is a schematic configuration view illustrating the touchscreen display device 100 according to the example embodiments. FIG. 2A and FIG. 2B illustrate two types of touch panels 150 of the touchscreen display device 100 according to the example embodiments. FIG. 3 is a plan view illustrating a display panel 110 of the touchscreen display device 100 according to the example embodiments.

As shown in FIG. 1, the touchscreen display device 100 according to the example embodiments is a display device having a touch input function. The touchscreen display device 100 includes the display panel 110, a data driver 120, a gate driver 130, a timing controller 140, the touch panel 150, and a touch driver 160.

The display panel 110 has a plurality of data lines DL and a plurality of gate lines GL disposed thereon. N×M subpixels SP are arranged on the display panel 110, in the form of a matrix consisting of N rows and M columns (hereinafter referred to as an N×M matrix), where N and M are each a natural number greater than or equal to 2. The data driver 120 drives the plurality of data lines DL disposed on the display panel 110. The gate driver 130 drives the plurality of gate lines GL disposed on the display panel 110 according to a predetermined sequence.

A plurality of touch electrodes TE are disposed on the touch panel 150. The touch driver 160 drives the plurality of touch electrodes TE disposed on the touch panel 150. The plurality of touch electrodes TE act as touch sensors enabling touch sensing.

As shown in FIG. 1, the touchscreen display device 100 according to the example embodiments further includes a touch controller 170 electrically connected to the touch driver 160. The touch controller 170 detects a touch occurrence and the coordinates of a touch point based on data (e.g. changes in capacitance, changes in a voltage, and the like) measured by the plurality of touch electrodes TE when the touch driver 160 drives the plurality of touch electrodes TE sequentially.

The touch controller 170 may be embodied as a separate component different from the touch driver 160 or may be embodied integrally with the touch driver 160. The touchscreen display device 100 may further include a micro control unit (MCU) or the like in addition to the touch controller 170. The touch controller 170 may be embodied as a separate component different from the MCU or may be embodied integrally with the MCU.

The timing controller 140 starts scanning based on timing within each frame, outputs converted video data by converting video data input from an external source into a data signal format readable by the data driver 120, and regulates data processing at a suitable point in time in response to the scanning.

The gate driver 130 drives the plurality of gate lines GL sequentially by supplying a scanning signal having an on or off voltage to the gate lines GL sequentially, under the control of the timing controller 140. The gate driver 130 may be positioned on one side of the display panel 110, as illustrated in FIG. 1. The gate driver 130 may alternatively be positioned on both sides of the display panel 110 depending on the driving system.

The gate driver 130 may include a plurality of gate driver integrated circuits (ICs). Each of the plurality of gate driver ICs may be connected to the bonding pads of the display panel 110 by tape-automated bonding (TAB) or chip-on-glass (COG) bonding, may be implemented as a gate-in-panel (GIP)-type IC directly disposed on the display panel 110, or in some cases, may be integrated with the display panel 110, forming a portion of the display panel 110. Each of the gate driver ICs may include such elements as a shift register and a level shifter.

When a specific gate line is opened or activated, the data driver 120 drives the plurality of data lines by converting video data received from the timing controller 140 into analog data voltages and supplying the analog data voltages to the plurality of data lines.

The data driver 120 may include a plurality of source driver ICs (also referred to as data driver ICs). Each of the source driver ICs may be connected to the bonding pads of the display panel 110 by tape-automated bonding (TAB) or chip-on-glass (COG) bonding, may be directly disposed on the display panel 110, or in some cases, may be integrated with the display panel 110, forming a portion of the display panel 110.

Each of the plurality of source driver ICs may include such elements as a shift register, a latch circuit, a digital-to-analog converter (DAC), and an output buffer. In some cases, each of the source driver ICs may further include an analog-to-digital converter (ADC) that senses an analog voltage value, converts the analog voltage value into a digital value, and outputs sensing data in order to enable subpixel compensation.

Alternatively, each of the plurality of source driver ICs may be implemented as a chip-on-film (COF) type driver IC. In such an implementation, one end of each of the plurality of source driver ICs may be bonded to a source printed circuit board (S-PCB), and the other end thereof bonded to the display panel 110. The S-PCB may be in the form of a single S-PCB, two S-PCBs, or three or more S-PCBs. In the following description, the display device 100 including two S-PCBs 150a and 150b is used as an example for the sake of brevity.

The source driver ICs included in the data driver 120 may be configured as a single group or may be divided into several groups. In the following description, an example configuration in which the first five source driver ICs on the left belong to a first group G1 and the remaining five source driver ICs to a second group G2 is described. However, different configurations of source driver ICs with different groupings and a different number of groups may be used.

The timing controller 140 receives image data of an image input from an external source and various timing signals, such as a vertical synchronization signal Vsync, a horizontal synchronization signal Hsync, an input data enable signal DE, and a clock signal CLK. The timing controller 140 outputs video data input from an external source by converting the video data into a data signal format readable by the data driver 120. The timing controller 140 also outputs various control signals to the data driver 120 and the gate driver 130 by generating the various control signals in response to the input timing signals, such as the vertical synchronization signal Vsync, the horizontal synchronization signal Hsync, the input data enable signal DE, and the clock signal CLK, in order to control the data driver 120 and the gate driver 130.

For example, the timing controller 140 may output various gate control signals (GCSs), including a gate start pulse (GSP), a gate shift clock (GSC), and a gate output enable signal (GOE), in order to control the gate driver 130. The gate start pulse GSP controls the operation start timing of the gate driver ICs of the gate driver 130. The gate shift clock GSC is a clock signal commonly input to each of the gate driver ICs, and controls the shift timing of the scanning signal (also referred to as a "gate pulse"). The gate output enable signal GOE designates the timing information of the gate driver ICs.

The timing controller 140 may also output various data control signals (DCSs), including a source start pulse (SSP), a source sampling clock (SSC) and a source output enable signal (SOE), in order to control the data driver 120. The source start pulse SSP controls the data sampling start timing of the source driver ICs of the data driver 120. The source sampling clock SSC is a clock signal to control the data sampling timing of each of the source driver ICs. The source output enable signal SOE controls the output timing of the data driver 120. In some cases, the data control signals may further include a polarity control signal (POL) in order to control the polarity of the data voltage output from the data driver 120.

As shown in FIG. 1, the touchscreen display device 100 may further include a control PCB (not shown) connected to the S-PCB via a flexible flat cable (FFC), a flexible printed circuit (FPC), or the like. The S-PCB and the control PCB may be integrated into a single PCB or may be embodied as separate PCBs. The control PCB may further have a power controller (not shown) disposed thereon. The power controller (not shown) may supply various voltages or currents to such elements as the display panel 110, the data driver 120, and the gate driver 130, or control the various voltages or currents to be supplied such elements. The power controller may be in the form of an IC or ICs and also be referred to as the power management IC (PMIC).

The touchscreen display device 100 schematically illustrated in FIG. 1 may be one selected from among, but is not limited to, a liquid crystal display (LCD) device, a plasma display device, and an organic light-emitting diode (OLED) display. Circuit elements, such as a transistor and a capacitor, are disposed in each of the subpixels SP disposed on the display panel 110. For example, when the display panel 110 is an OLED panel, a circuit including an OLED, two or more transistors, and one or more capacitors may be formed in each of the subpixels SP.

The touchscreen display device 100 may employ a capacitance touch technology that senses a touch occurrence and the coordinates of a touch point by measuring changes in capacitance using the plurality of touch electrodes TE disposed on the touch panel 150. The capacitance touch technology may employ, for example, mutual capacitance touch sensing or self-capacitance touch sensing.

According to the mutual capacitance touch sensing technology, one type of capacitance touch technology, the plurality of touch electrodes TE may be divided into Tx electrodes (also referred to as touch driving electrodes) to which touch driving voltages (touch driving signals) are applied and Rx electrodes (also referred to as touch sensing electrodes) that sense the touch driving voltages (touch driving signals), each of the Rx electrodes forming capacitance in concert with a corresponding Tx electrode. In the mutual capacitance touch sensing, a touch occurrence and the coordinates of a touch point are sensed based on a change in capacitance (a change in mutual capacitance) between the touched electrodes (the corresponding Tx and Rx electrodes). The touch may be made by a pointer, such as a finger, a pen-like pointer, or a stylus.

In the self-capacitance sensing technology, another type of capacitance touch technology, each of the plurality of touch electrodes TE forms capacitance (self-capacitance) with a pointer, such as a finger, a pen-like pointer, or a stylus. The value of capacitance between each of the touch electrodes TE and the pointer is measured depending on the presence of the pointer, such as a finger, a pen-like pointer, or a stylus. A touch occurrence and the coordinates of a touch point are sensed based on the measured value of capacitance. Unlike the mutual capacitance sensing technology, the self-capacitance sensing technology allows a touch driving voltage (a touch driving signal) to be both applied to and sensed from each of the touch electrodes TE. Thus, for the self-capacitance sensing technology, there is no distinction between the Tx electrodes and the Rx electrodes.

The touchscreen display device 100 according to the example embodiments of the present invention can employ one of the above-described two types of capacitance touch technology (mutual capacitance touch sensing and self-capacitance touch sensing). In the following description, the embodiments will be described as employing self-capacitance touch sensing for the sake of brevity, but the present disclosure is not limited thereto.

As shown in FIGS. 2A and 2B, the above-described touch panel 150 may be in the form of an external touch panel or an integral touch panel. If the touch panel 150 is an external touch panel (also referred to as an "add-on touch panel"), the touch panel 150 on which the plurality of touch electrodes TE are disposed is attached to the display panel 110. In this case, the touch panel 150 and the display panel 110 may be fabricated using separate processes and then be attached to each other. One advantage of employing an external touch panel as the touch panel 150 is that the display panel 110 can be fabricated using a relatively simple process, since the touch panel 150 and the display panel 110 are separately fabricated.

If the touch panel 150 is embodied as an integral touch panel, the touch panel 150, having the plurality of touch electrodes TE, is disposed within or integral to the display panel 110. That is, if the touch panel 150 is an integral touch panel, the plurality of touch electrodes TE are disposed within the display panel 110. The integral touch panel may be an on-cell touch panel in which the plurality of touch electrodes being present on the cell or an in-cell touch panel in which the plurality of touch electrodes being present within the cell.

If the touch panel 150 is embodied as an integral touch panel as described above, a fabrication process of the display panel 110 may be more complicated, since the touch panel 150 must be formed as part of the display panel 110 during the fabrication of the display panel 110. However, since both the touch panel 150 and the display panel 110 can be fabricated using a single fabrication process, the entire fabrication process may be regarded as being relatively simple. Another advantage is that the touchscreen display device 100 may be more compact, with the thickness of the device being reduced, compared to the external touch panel.

As shown FIG. 3 and as described above, the N×M subpixels SP are disposed on the display panel 110 of the touchscreen display device 100 according to the example embodiments, arranged in the form of the N×M matrix. In this example of a subpixel structure in which a single data line and a single gate line are connected to a single subpixel SP among the N×M subpixels SP, M data lines DL (M is a natural number equal to or greater than 2) and N gate lines GL (N is a natural number equal to or greater than 2) are disposed on the display panel 110, as illustrated in FIG. 3, such that the N×M subpixels SP in the form of a N×M matrix are disposed on the display panel 110.

Alternatively to the structure of the display panel 110 illustrated in FIG. 3, for the N×M subpixels SP in the N×M matrix disposed on the display panel 110, any number of data lines lower or higher than the M data lines DL and any number of gate lines lower or higher than the N gate lines GL may be disposed on the display panel 110, depending on the design structure and the driving mechanism of the subpixels.

For the sake of brevity, in the example discussed below, the M data lines DL and the N gate lines GL are disposed on the display panel 110, as illustrated in FIG. 3, such that the N×M subpixels SP in the N×M matrix are disposed on the display panel 110. Thus, in this example, the number of rows of the subpixels is equal to the number of the gate lines GL, and the number of columns of the subpixels is equal to the number of the data lines DL. However, the present invention is not limited thereto.

As shown in FIG. 3, since the N×M subpixels SP are arranged in the N×M matrix on the display panel 110, the N×M subpixels SP may be considered as being arranged in N subpixel rows SPR #1, SPR #2, . . . , and SPR #N. The N×M subpixels SP may also be considered as being arranged in M subpixel columns SPC #1, SPC #2, ..., and SPC #M.

Figure 4:
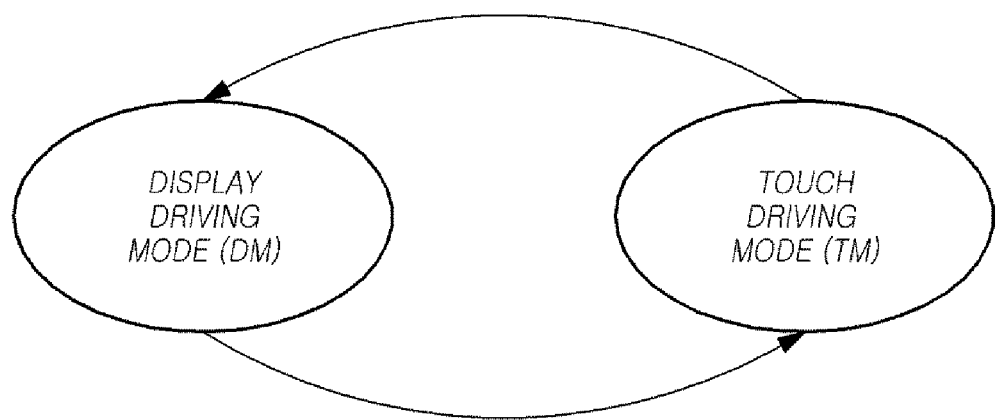
FIG. 4 is a diagram illustrating two driving modes of the touchscreen display device according to the example embodiments.

FIG. 4 is a diagram illustrating two driving modes of the touchscreen display device 100 according to the example embodiments. As shown in FIG. 4, the touchscreen display device 100 according to the example embodiments has two driving modes, i.e., a display driving mode (DM) and a touch driving mode (TM), since the touchscreen display device 100 not only functions to display images but also provides a touch input function by sensing a touch on the screen, and determining a touch occurrence and the coordinates of a touched point. In other words, the touchscreen display device 100 according to the example embodiments can operate in the DM and in the TM.

For example, the touchscreen display device 100 according to the example embodiments may alternately perform display driving and touch driving during the period of a single frame by diving the single frame into one or more sections in which the DM is to be performed (hereinafter referred to as "display driving mode (DM) sections") and one or more sections in which the TM is performed (hereinafter referred to as "touch driving mode (TM) sections"). This driving scheme is described below in more detail.

Figure 5:
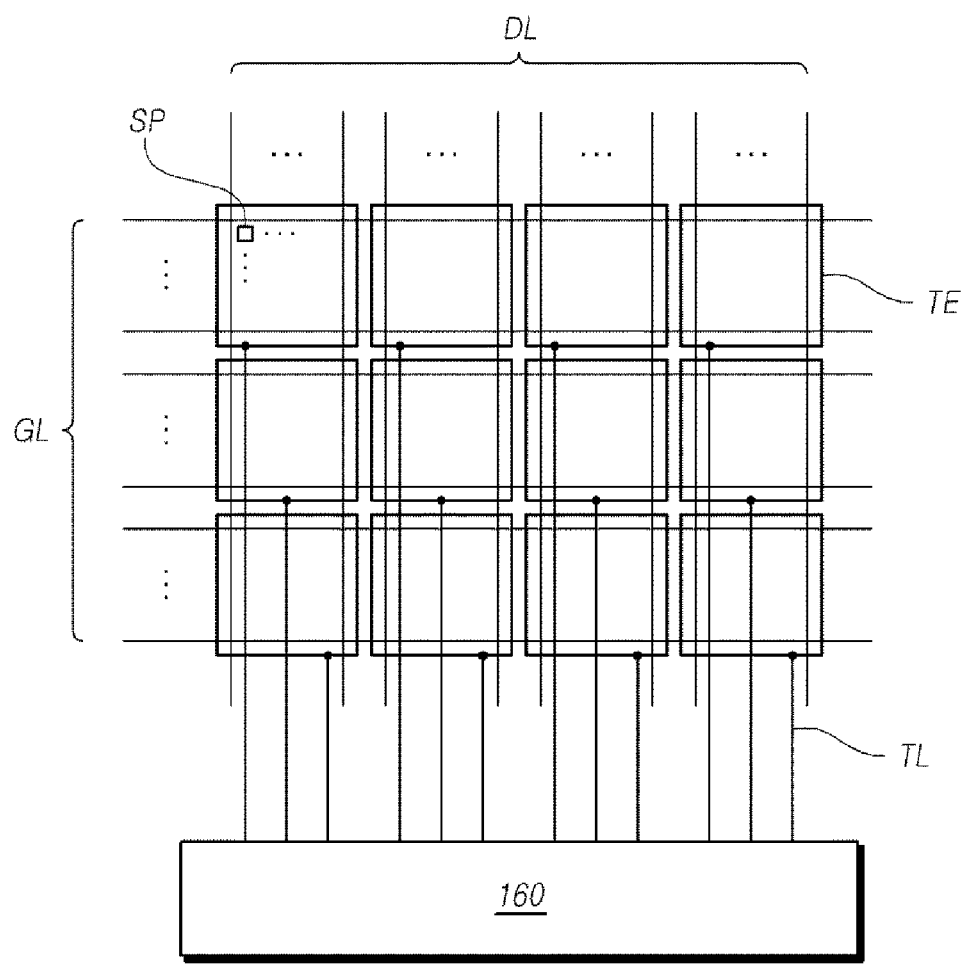
FIG. 5 is a block diagram illustrating an example arrangement of touch electrodes on the display panel of the touchscreen display device according to the example embodiments when the touch panel disposed on the display panel is an integral touch panel.

FIG. 5 is a block diagram illustrating an example arrangement of the touch electrodes TE on the display panel 110 of the touchscreen display device 100 according to the example embodiments when the touch panel 150 disposed on the display panel 110 is an integral touch panel. As shown in FIG. 5, the plurality of touch electrodes TE and a plurality of touch signal lines TL electrically connecting the plurality of touch electrodes TE to the touch driver 160 are arranged on the display panel 110. The display panel 110 having the integral touch panel 150 can be implemented by forming the plurality of touch electrodes TE and the plurality of signal lines TL on the display panel 110 in this manner.

As shown in FIG. 5, each of the plurality of touch electrodes TE may be implemented as an electrode having a predetermined shape (e.g., a block). In addition, the size of each of the plurality of touch electrodes TE may be larger than the size of each of the plurality of subpixels SP. Thus, the number of the touch electrodes TE disposed on the display panel 110 may be smaller than the number (N×M) of the subpixels SP.

The plurality of touch electrodes TE may be common electrodes to which a common voltage is applied in each of the display driving mode (DM) sections. In this example, the common electrodes to which a common voltage is applied in each of the display driving mode (DM) sections are used as the touch electrodes TE, such that separate touch electrodes TE are not required. Consequently, possible advantages of this example are that the display panel 110 can be fabricated with fewer processing steps, and that the thickness of the display panel 110 is not significantly increased even though the touch panel 150 is integrated within the display panel 110.

Figure 6:
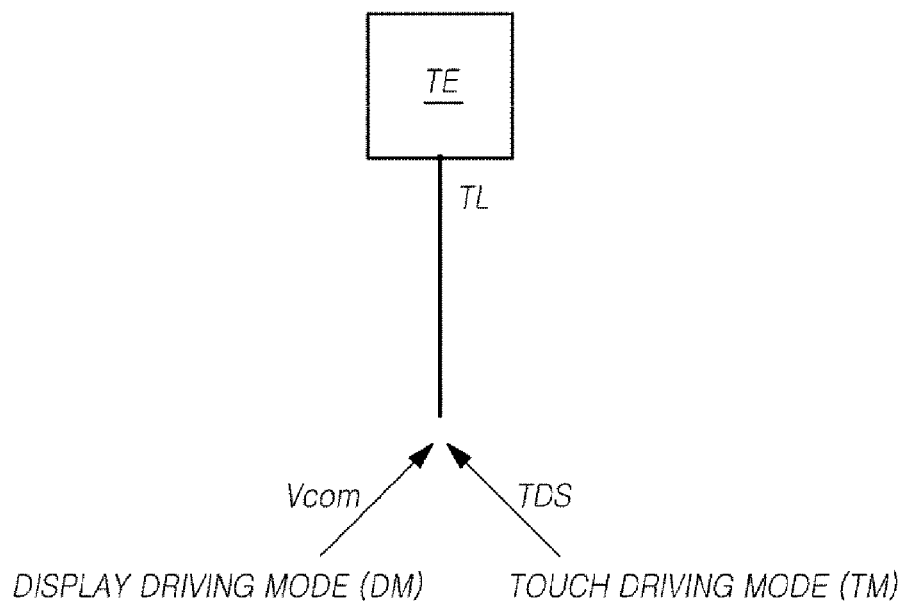
FIG. 6 is a diagram illustrating signals applied to a touch electrode depending on driving modes when the common electrodes on the display panel having the integral touch panel are used as touch electrodes in the touchscreen display device according to the example embodiments.

FIG. 6 is a diagram illustrating signals applied to a touch electrode TE depending on driving modes where the common electrodes on the display panel 110 having the integral touch panel 150 are used as touch electrodes in the touchscreen display device 100 according to the example embodiments. As shown in FIG. 6, when the touchscreen display device 100 operates in the display driving mode (DM), a common voltage Vcom is applied to the touch electrode TE via a signal line TL. When the touchscreen display device 100 operates in the touch driving mode (TM), a touch driving signal TDS is applied to the touch electrode TE via the signal line TL. Thus, the touch electrode TE serves as a touch sensor in the TM and serves as a common electrode opposite a pixel electrode in the DM.

Figure 7:
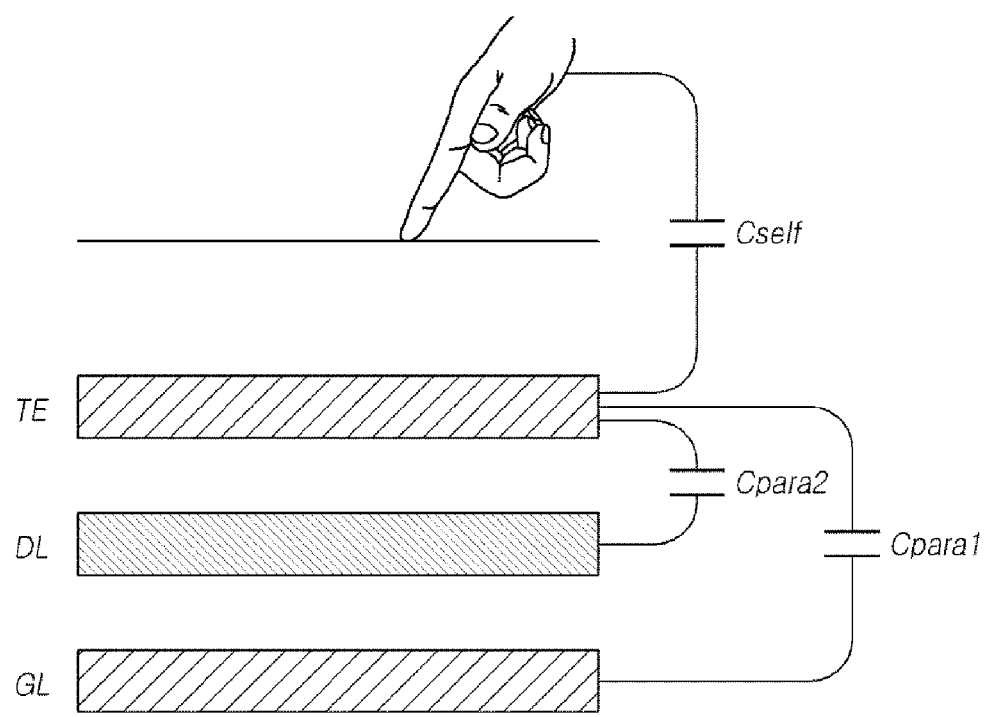
FIG. 7 is a diagram illustrating several types of capacitance that may be formed during a touch driving mode in the touchscreen display device according to the example embodiments.

FIG. 7 is a diagram illustrating several types of capacitance Cself, Cpara1, and Cpara2 formed during the touch driving mode (TM) in the touchscreen display device 100 according to the example embodiments. As shown in FIG. 7, in the TM, each of the plurality of touch electrodes TE forms capacitance Cself in concert with a pointer, such as a finger, a pen-like pointer, or a stylus, in order to sense a touch occurrence and the coordinates of a touched point, but it may also unnecessarily form parasitic capacitance Cpara1 and Cpara2 together with a corresponding data line DL and a corresponding gate line GL that are used for display driving. The parasitic capacitance formed in the TM may cause a large amount of load in touch driving, may lower the accuracy of touch sensing, or may make touch sensing impossible or difficult. In addition, the parasitic capacitance Cpara may increase with an increase in the size of the touchscreen display device 100 or the display panel 110, thereby possibly causing greater problems in touch sensing.

Figure 8:
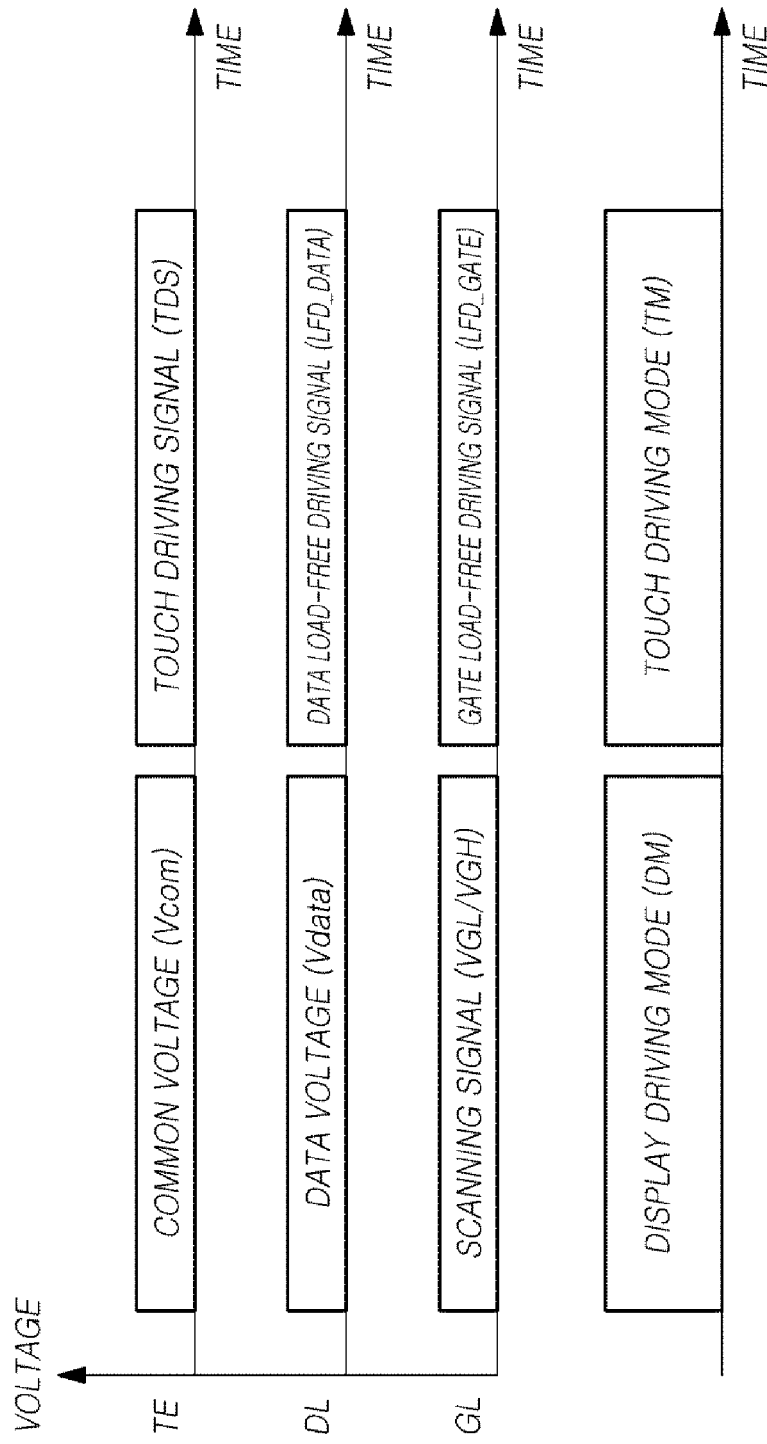
FIG. 8 is a diagram illustrating signals applied to touch electrodes, data lines, and gate lines in a display driving mode and a touch driving mode, respectively, when a load-free driving function is applied in the touchscreen display device according to the example embodiments.

FIG. 8 is a diagram illustrating signals applied to touch electrodes TE, data lines DL, and gate lines GL in the display driving mode (DM) and the touch driving mode (TM), respectively, when a load-free driving function is implemented in the touchscreen display device 100 according to the example embodiments. Load-free driving serves to remove or significantly reduce parasitic capacitance formed during touch driving, and is undertaken together with touch driving. The parasitic capacitance formed during touch driving may act as a load during touch driving, thereby decreasing the accuracy of touch sensing.

As shown in FIG. 8, during the DM, the touchscreen display device 100 according to the example embodiments applies a data voltage to the data lines DL, a scanning signal VGL/VGH to the gate lines DL, and a common voltage Vcom to the touch electrodes TE serving as a common electrode.

As shown in FIG. 8, during the TM, the touchscreen display device 100 according to the example embodiments may apply a gate load-free driving signal LFD_GATE to the gate lines GL and a data load-free driving signal LFD_DATA to the data lines DL while applying a touch driving signal TDS to the touch electrodes TE. The signals LFD_GATE and LFD_DATA are intended to minimize the influence of parasitic capacitance Cpara1 and Cpara2.

As shown in FIG. 8, during the TM, while a touch driving signal TDS is being applied to all or some of the plurality of touch electrodes TE, the gate driver 130 applies a gate load-free driving signal LFD_GATE to all or some of the plurality of gate lines GL in order to prevent parasitic capacitance Cpara1 from being formed unnecessarily between the touch electrodes TE and the gate lines GL. In this manner, during the TM, when the gate driver 130 applies the gate load-free driving signal LFD_GATE to all or some of the plurality of gate lines GL while the touch driver 160 is applying the touch driving signal TDS to all or some of the plurality of touch electrodes TE, little to no difference in charge occurs between the touch electrodes TE and the gate lines GL, thereby preventing or significantly reducing parasitic capacitance Cpara1 between the touch electrodes TE and the gate lines GL.

Also as shown in FIG. 8, during the TM, the data driver 120 applies a data load-free driving signal LFD_DATA to all or some of the plurality of data lines DL while the touch driving signal TDS is being applied to all or some of the plurality of touch electrodes TE, such that parasitic capacitance is not formed unnecessarily between the touch electrodes TE and the data lines DL. In this manner, during the TM, when the data driver 120 applies the data load-free driving signal LFD_DATA to all or some of the plurality of data lines DL while the touch driver 160 is applying the touch driving signal TDS to all or some of the plurality of touch electrodes TE, little to no difference in charge occurs between the touch electrodes TE and the data lines DL, thereby preventing or significantly reducing parasitic capacitance Cpara2 between the touch electrodes TE and the data lines DL.

A load-free driving signal for load free driving, such as the gate load-free driving signal LFD_GATE or the data load-free driving signal LFD_DATA, is a signal corresponding to the touch driving signal TDS. The phase of the load-free driving signal may be equal to, for example, the phase of the touch driving signal TDS. In some cases, the amplitude of the load-free driving signal for load free driving, such as the gate load-free driving signal LFD_GATE or the data load-free driving signal LFD_DATA, may be equal to the amplitude of the touch driving signal TDS.

As described above, during the TM, the data load-free driving signal LFD_DATA is applied to all or some of the plurality of data lines DL and the gate load-free driving signal LFD_GATE to all or some of the plurality of gate lines GL while the touch driving signal TDS is being applied to the touch electrodes TE. This can consequently remove or significantly reduce a resistor capacitor (RC) load due to parasitic capacitance Cpara1 between the touch electrodes TE and the gate lines GL, and due to parasitic capacitance Cpara2 between the touch electrodes TE and the data lines DL and improve sensitivity.

During the TM, while a touch driving signal TDS is being applied to a predetermined touch electrode TE, the touchscreen display device 100 according to the example embodiments can apply a load-free driving signal for minimizing the influence of parasitic capacitance to another touch electrode TE.

Also, in the touchscreen display device 100 according to the example embodiments, each of a touch driving signal TDS and various load-free driving signals generated during the TM may have a waveform in the shape of, for example, a pulse width modulation signal.

Figure 9:
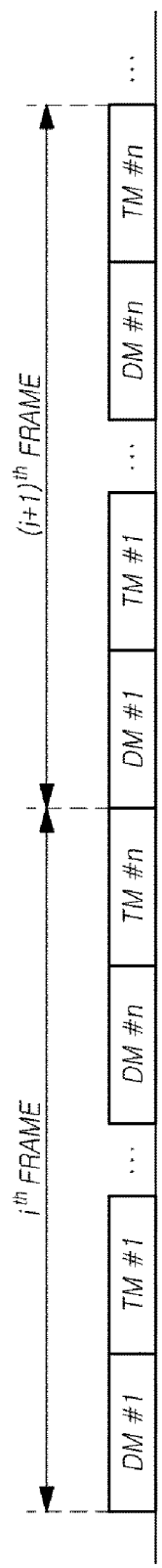
FIG. 9 is a diagram illustrating driving modes in each frame in the touchscreen display device according to the example embodiments.

FIG. 9 is a diagram illustrating driving modes in each frame in the touchscreen display device 100 according to the example embodiments. As shown in FIG. 9, a single frame may consist of n display driving mode sections DM #1, . . . , and DM #n and n touch driving mode sections TM #1, . . . , and TM #n, where n is a natural number equal to or greater than 2, and smaller than N. In other words, each of the $i^{th}$ frame and the $(i+1)^{th}$ frame (i.e. the frame immediately following the $i^{th}$ frame) consists of n display driving mode sections DM #1, . . . , and DM #n and n touch driving mode sections TM #1, . . . , and TM #n, where i is a positive integer. Here, the "$i^{th}$ frame" may be an odd frame, and the "$(i+1)^{th}$ frame" may be an even frame. Alternatively, the "$i^{th}$ frame" may be an even frame, and the "$(i+1)^{th}$ frame" may be an odd frame.

In FIG. 9, the n touch driving mode (TM) sections are illustrated as being present within a single frame. However, in some cases, n−1, n, n+1, or some other number of touch driving mode (TM) sections may be present.

As described above, the n display driving mode sections DM #1 to DM #n in a single frame are separated from one another by the touch driving mode sections, instead of being consecutively arranged. Thus, a single frame is not consecutively displayed simultaneously, but the entire area of the screen is divided into n number of partial areas while displaying an image. Hereinafter, this type of display driving will be referred to as "split screen display driving."

In the split screen display driving, a method of driving the touchscreen display device 100 includes an $i^{th}$ frame driving operation of alternately driving two or more display driving mode sections DM #1 to DM #n (n is a natural number equal to or greater than 2) constituting the $i^{th}$ frame and one or more touch driving mode (TM) sections, and an $(i+1)^{th}$ frame driving operation of alternately driving two or more display driving mode sections DM #1 to DM #n (n is a natural number equal to or greater than 2) constituting the $(i+1)^{th}$ frame and one or more touch driving mode (TM) sections.

According to the split screen display driving as described above, the entire area of a screen is divided into partial areas, the number of which is the same as the number of display driving mode sections present within a single frame. When n display driving mode sections are present within a single frame, the touchscreen display device 100 divides the entire area of the screen into n partial areas, and drives the "n divided sections" by matching the "n divided sections" to the "n display driving mode sections DM #1 to DM #n."

Figure 10:
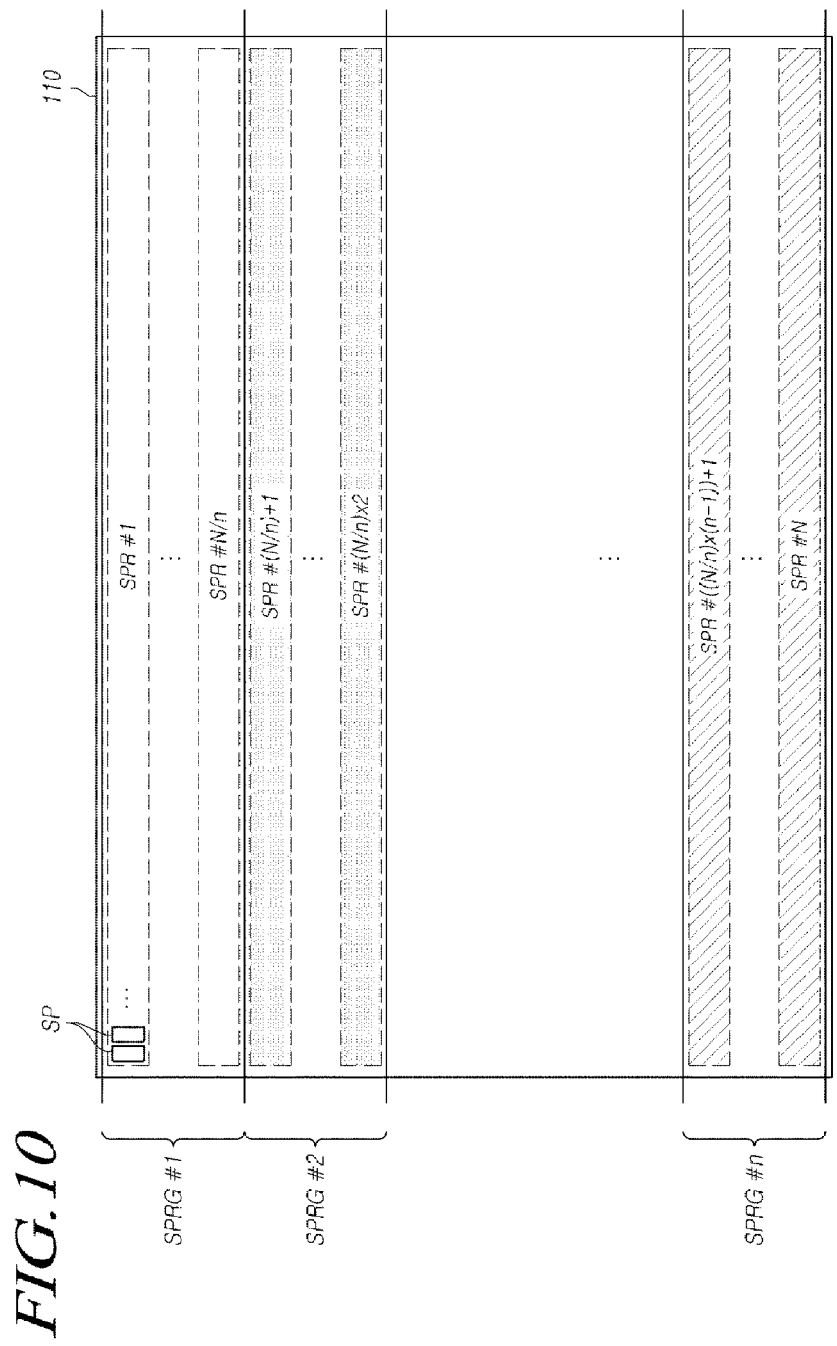
FIG. 10 is a diagram illustrating an example structure of the display panel for split screen display driving in the touchscreen display device according to the example embodiments.

FIG. 10 is a diagram illustrating an example structure of the display panel 110 for split screen display driving in the touchscreen display device 100 according to the example embodiments. As described above with reference to FIG. 3, the N×M subpixels disposed on the display panel 110 are arranged in the N subpixel rows SPR #1, SPR #2, . . . , and SPR #N, where N is greater than n. The N subpixel rows SPR #1, SPR #2, . . . , and SPR #N are divided into n subpixel row groups SPRG #1, SPRG #2, . . . , and SPRG #n, each of which consists of N/n subpixel rows. Here, N is the number of subpixel rows on the display panel 110, which may be the same as the number of gate lines. n is the number of subpixel row groups, by which the entire area of the screen is divided. N/n is the number of subpixel rows in a single subpixel row group.

When the concept of subpixel row groups is applied, the N subpixel rows SPR #1, SPR #2, . . . , and SPR #N illustrated in FIG. 3 may be represented as SPR #1 to SPR #(N/n); SPR #(N/n)+1 to SPR #(N/n)×2; . . . ; and SPR #((N/n)×(n−1))+1 to SPR #N, as illustrated in FIG. 10. As shown in FIG. 10, the subpixel row group SPRG #1 includes subpixel rows SPR #1 to SPR #N/n. The subpixel row group SPRG #2 includes subpixel rows SPR #(N/n)+1 to SPR #(N/n)×2. In this manner, the subpixel row group SPRG #n includes subpixel rows SPR #((N/n)×(n−1))+1 to SPR #N.

As shown in FIG. 10, the n subpixel row groups SPRG #1, SPRG #2, . . . , and SPRG #n correspond to the n number of display driving mode sections DM #1, DM #2, . . . , and DM #n in a single frame. According to the structure of the above-described display panel 110, it is possible to drive the display panel 110 by dividing the entire screen according to the n display driving mode sections DM #1, DM #2, . . . , and DM #n. In this specification, two types of split screen display driving are described below by way of example with reference to FIG. 11 and FIG. 12, respectively.

Figure 11:
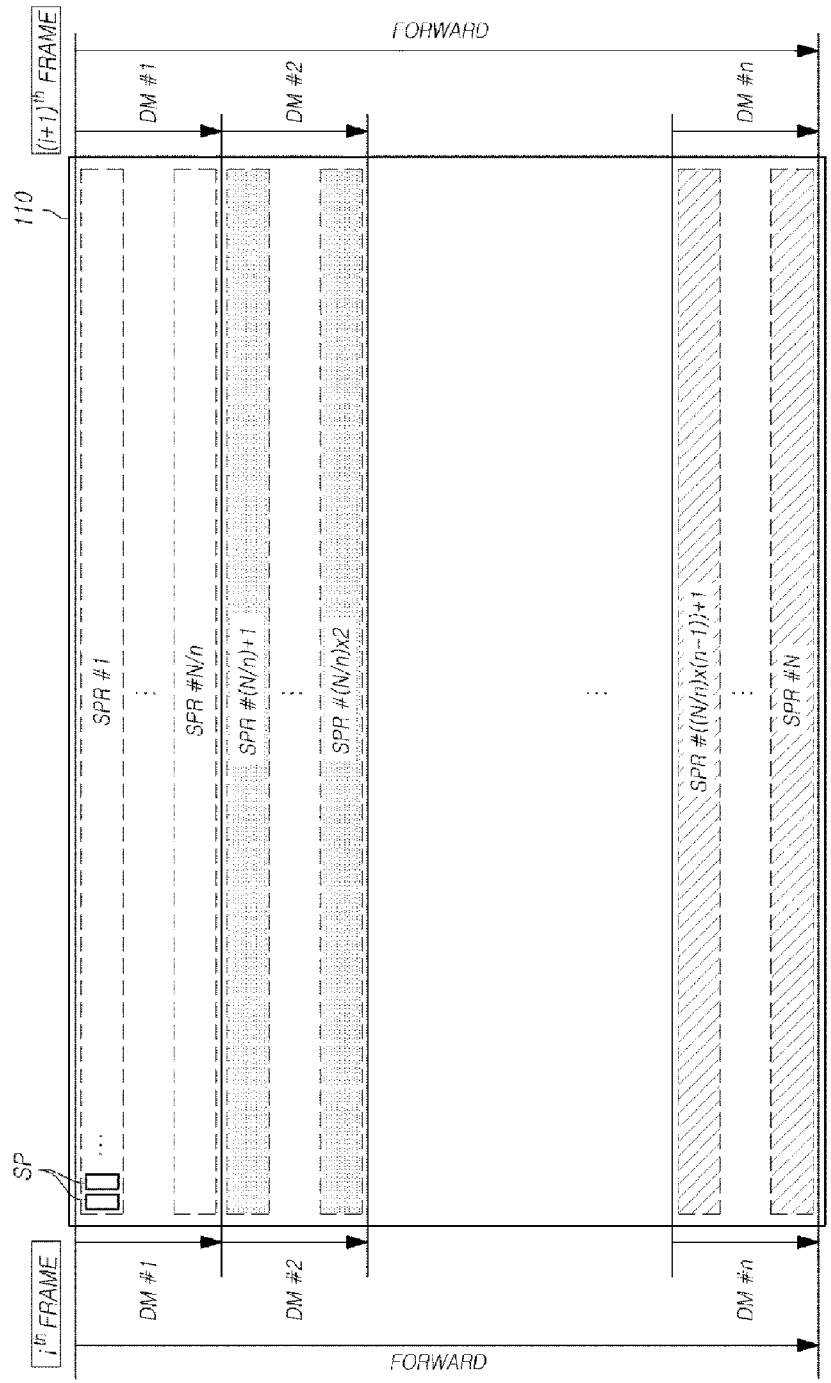
FIG. 11 is a diagram illustrating an example of the split screen display driving, in which the driving sequences are the same for consecutive frames, in the touchscreen display device according to the example embodiments.

FIG. 11 is a diagram illustrating an example of split screen display driving, in which driving sequences according to frames are the same, in the touchscreen display device 100 according to the example embodiments. As shown in FIG. 11, N subpixel rows SPR #1, SPR #2, . . . , and SPR #N are divided into and driven in n display driving mode sections DM #1, DM #2, . . . , and DM #n in the $i^{th}$ frame, in the same sequence in which the N subpixel rows SPR #1, SPR

2, . . . , and SPR #N are divided into and driven in n display driving mode sections DM #1, DM #2, . . . , and DM #n in the (i+1)$^{th}$ frame.

As shown in FIG. 11, the sequence in which the N subpixel rows SPR #1, SPR #2, . . . , and SPR #N are driven in n display driving mode sections DM #1, DM #2, . . . , and DM #n in the i$^{th}$ frame may be the same forward sequence in which the N subpixel rows SPR #1, SPR #2, . . . , and SPR #N are driven in n display driving mode sections DM #1, DM #2, . . . , and DM #n in the (i+1)$^{th}$ frame. Here, the term "forward sequence" is the sequence from SPR #1 to SPR #N. In contrast, the term "reverse sequence" is the sequence from SPR #N to SPR #1.

As shown in FIG. 11, in the i$^{th}$ frame, subpixel rows SPR #1 to SPR #N/n included in the subpixel row group SPRG #1 are driven sequentially during the display driving mode section DM #1. After the display driving mode section DM #1, subpixel rows SPR #(N/n)+1 to SPR #(N/n)×2 included in the subpixel row group SPRG #2 are driven sequentially during the display driving mode section DM #2. In the same manner, subpixel rows SPR #((N/n)×(n−1))+1 to SPR #N included in the subpixel row group SPRG #n are driven sequentially during the display driving mode section DM #n. Consequently, the N subpixel rows SPR #1, SPR #2, . . . , and SPR #N are driven sequentially in the forward sequence: SPR #1→SPR #2→ . . . →SPR #N−1→SPR #N.

As shown in FIG. 11, in the (i+1)$^{th}$ frame, subpixel rows SPR #1 to SPR #N/n included in the subpixel row group SPRG #1 are driven sequentially during the display driving mode section DM #1. After section DM #1, subpixel rows SPR #(N/n)+1 to SPR #(N/n)×2 included in the subpixel row group SPRG #2 are driven sequentially during the display driving mode section DM #2. In the same manner, subpixel rows SPR #((N/n)×(n−1))+1 to SPR #N included in the subpixel row group SPRG #n are driven sequentially during the display driving mode section DM #n. Consequently, the N subpixel rows SPR #1, SPR #2, . . . , and SPR #N are driven sequentially in the forward sequence: SPR #1→SPR #2→ . . . →SPR #N−1→SPR #N.

Figure 12:
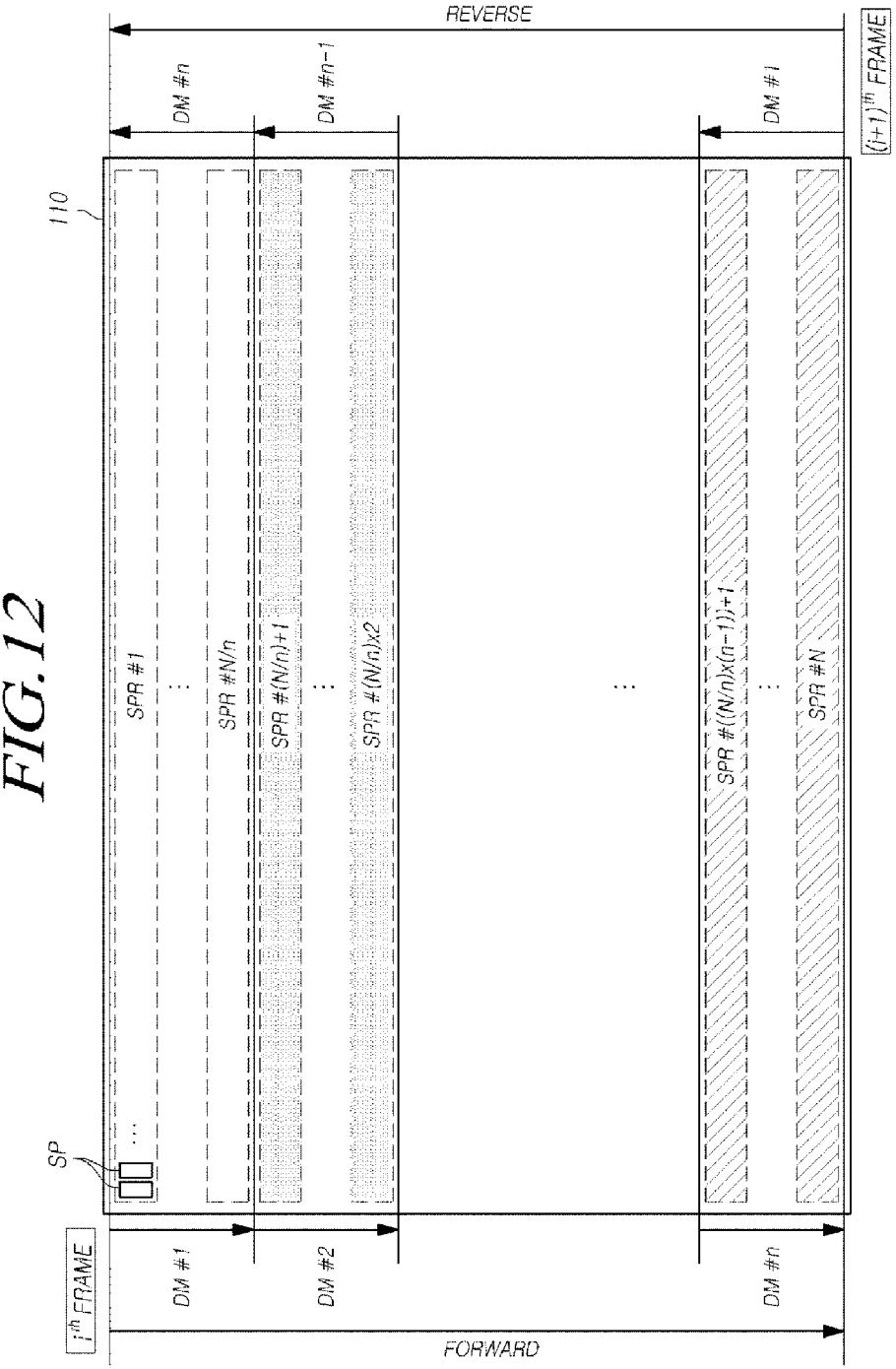
FIG. 12 is a diagram illustrating another example of the split screen display driving, in which the driving sequences may be different for two consecutive frames, in the touchscreen display device 100 according to the example embodiments.

FIG. 12 is a diagram illustrating another example of split screen display driving, in which driving sequences according to frames are different, in the touchscreen display device 100 according to the example embodiments.

As shown in FIG. 12, the sequence in which the N subpixel rows SPR #1, SPR #2, . . . , and SPR #N are driven in the n display driving mode sections DM #1, DM #2, . . . , and DM #n in the i$^{th}$ frame may differ from the sequence in which the N subpixel rows SPR #1, SPR #2, . . . , and SPR #N are driven in the n display driving mode sections DM #1, DM #2, . . . , and DM #n in the (i+1)$^{th}$ frame. As described above, in this example, when a video image of a moving object is displayed on the screen, split screen driving is performed by dividing the entire area of the screen into several partial areas such that a single frame is divided into two or more display driving mode sections and one or more touch driving mode sections each interposed between the display driving mode sections, whereby the subpixel rows in the two consecutive frames are driven in different sequences. It is therefore possible to prevent or mitigate the same abnormalities in an image from repeatedly appearing for a prolonged period such that a user notices few or no abnormality in the video image.

In the example shown in FIG. 12, the sequence in which the N subpixels SPR #1, SPR #2, . . . , and SPR #N are divided into and driven in n display driving mode sections DM #1, DM #2, . . . , and DM #n in the i$^{th}$ frame is the reverse of the sequence in which the N subpixel rows SPR #1, SPR #2, SPR #N are driven in the n display driving mode sections DM #1, DM #2, . . . , and DM #n in the (i+1)$^{th}$ frame. To implement this example split screen driving, the gate driver 130 can output a scanning signal to the gate lines sequentially from the first gate line to the last gate line (or from the last gate line to the first gate line) in the i$^{th}$ frame, and output a scanning signal to the gate lines sequentially in the reverse order from the last gate line to the first gate line (or from the first line to the last gate line) in the (i+1)$^{th}$ frame.

In conjunction with the gate driver 130, the data driver 120 can perform data driving according to the above gate driving sequence. Specifically, the data driver 120 may output corresponding data voltages sequentially from the first subpixel row to the last subpixel row (or from the last subpixel row to the first subpixel row) in the i$^{th}$ frame, and output corresponding data voltages sequentially in the reverse order from the last subpixel row to the first subpixel row (or from the first subpixel row to the last subpixel row) in the (i+1)$^{th}$ frame.

As illustrated in FIG. 12, the sequence in which the N subpixels SPR #1, SPR #2, . . . , and SPR #N are driven sequentially in the n display driving mode sections DM #1, DM #2, . . . , and DM #n in the i$^{th}$ frame is the forward sequence in which the N subpixels SPR #1, SPR #2, . . . , and SPR #N are driven from the first subpixel row SPR #1 to the N$^{th}$ subpixel row SPR #N. In contrast, the sequence in which the N subpixel rows SPR #1, SPR #2, . . . , and SPR #N are driven in the n display driving mode sections in the (i+1)$^{th}$ frame is the reverse sequence in which the N subpixel rows SPR #1, SPR #2, . . . , and SPR #N are driven from the N$^{th}$ subpixel row SPR #N to the first subpixel row SPR #1.

As described above, when a video image of a moving object is displayed on the screen, split screen driving may be performed by dividing the entire area of the screen into several partial areas such that a single frame is divided into two or more display driving mode sections and one or more touch driving mode sections each interposed between the driving mode sections, whereby the subpixel rows in the two consecutive frames are driven in reverse sequences. It is therefore possible to minimize the repetition of equal abnormalities in an image for a prolonged period such that a user does notices few or no abnormalities in the video image.

As shown in FIG. 12, in the i$^{th}$ frame, subpixel rows SPR #1 to SPR #N/n included in the subpixel row group SPRG #1 are driven sequentially during the display driving mode section DM #1. After the display driving mode section DM #1, subpixel rows SPR #(N/n)+1 to SPR #(N/n)×2 included in the subpixel row group SPRG #2 are driven sequentially during the display driving mode section DM #2. In the same manner, subpixel rows SPR #((N/n)×(n−1))+1 to SPR #N included in the subpixel row group SPRG #n are driven sequentially during the display driving mode section DM #n. Consequently, the N subpixel rows SPR #1, SPR #2, . . . , and SPR #N are driven sequentially in the forward sequence: SPR #1→SPR #2→ . . . →SPR #N−1→SPR #N.

Also as shown in FIG. 12, in the (i+1)$^{th}$ frame, subpixel rows SPR #N to SPR #((N/n)×(n−1))+1 included in the subpixel row group SPRG #n are driven sequentially during the display driving mode section DM #1. In the same manner, subpixel rows SPR #(N/n)×2 to SPR #(N/n)+1 included in the subpixel row group SPRG #2 are driven sequentially during the display driving mode section DM #n−1. After the display driving mode section DM #n−1, subpixel rows SPR #(N/n) to SPR #1 included in the subpixel row group SPRG #1 are driven sequentially during the display driving mode section DM #n. Consequently, the N subpixel rows SPR #1, SPR #2, . . . , and SPR #N are driven sequentially in the reverse sequence: SPR #N→SPR #N−1→ . . . →SPR #2→SPR #1.

Hereinafter, the two types of split screen display driving that are described above with reference to FIG. 11 and FIG. 12, respectively, are described in more detail by way of example with reference to FIGS. 13 to 26.

Figure 13:
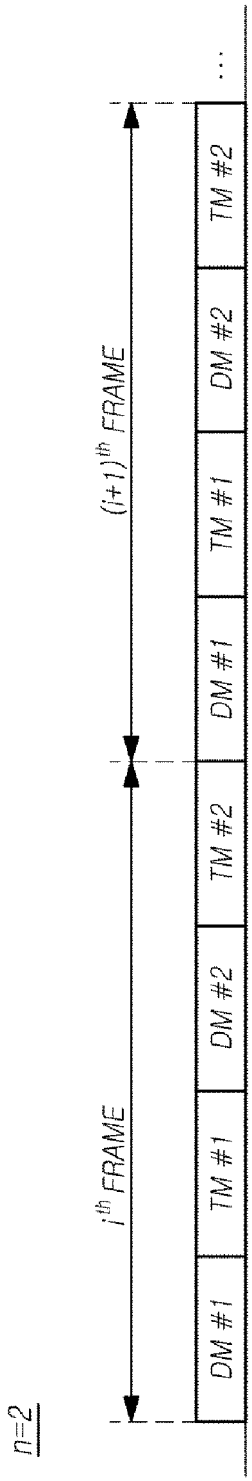
FIG. 13 is a diagram illustrating an example with two display driving mode sections and two touch driving mode sections in the touchscreen display device according to the example embodiments.

FIG. 13 is a diagram illustrating two display driving mode sections DM #1 and DM #2 and two touch driving mode sections TM #1 and TM #2 within a single frame in the touchscreen display device 100 according to an example embodiment. FIG. 13 illustrates an example of FIG. 9 where n=2, indicating that the entire area of the screen is divided into two partial areas, and that there are two subpixel row groups. Thus, the touchscreen display device 100 according to this example embodiment performs display driving on one of the two divided sections during the display driving mode section DM #1, performs touch driving during the touch driving mode section TM #1, performs display driving on the other of the two divided sections during the display driving mode section DM #2, and subsequently performs touch driving during the touch driving mode section TM #2.

Figure 14:
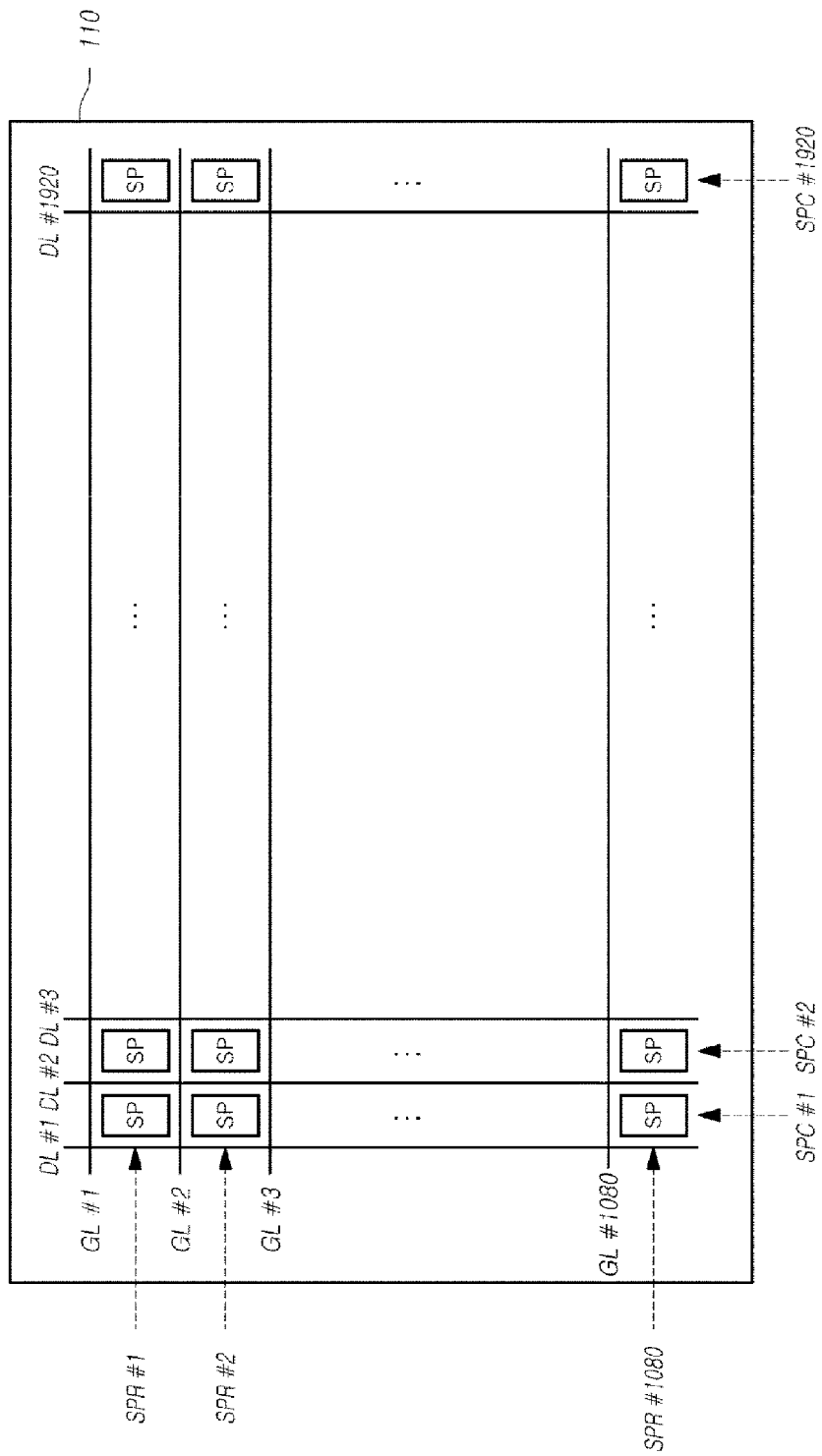
FIG. 14 and FIG. 15 are diagrams illustrating an example structure of the display panel representing an example of split screen display driving.
Figure 15:
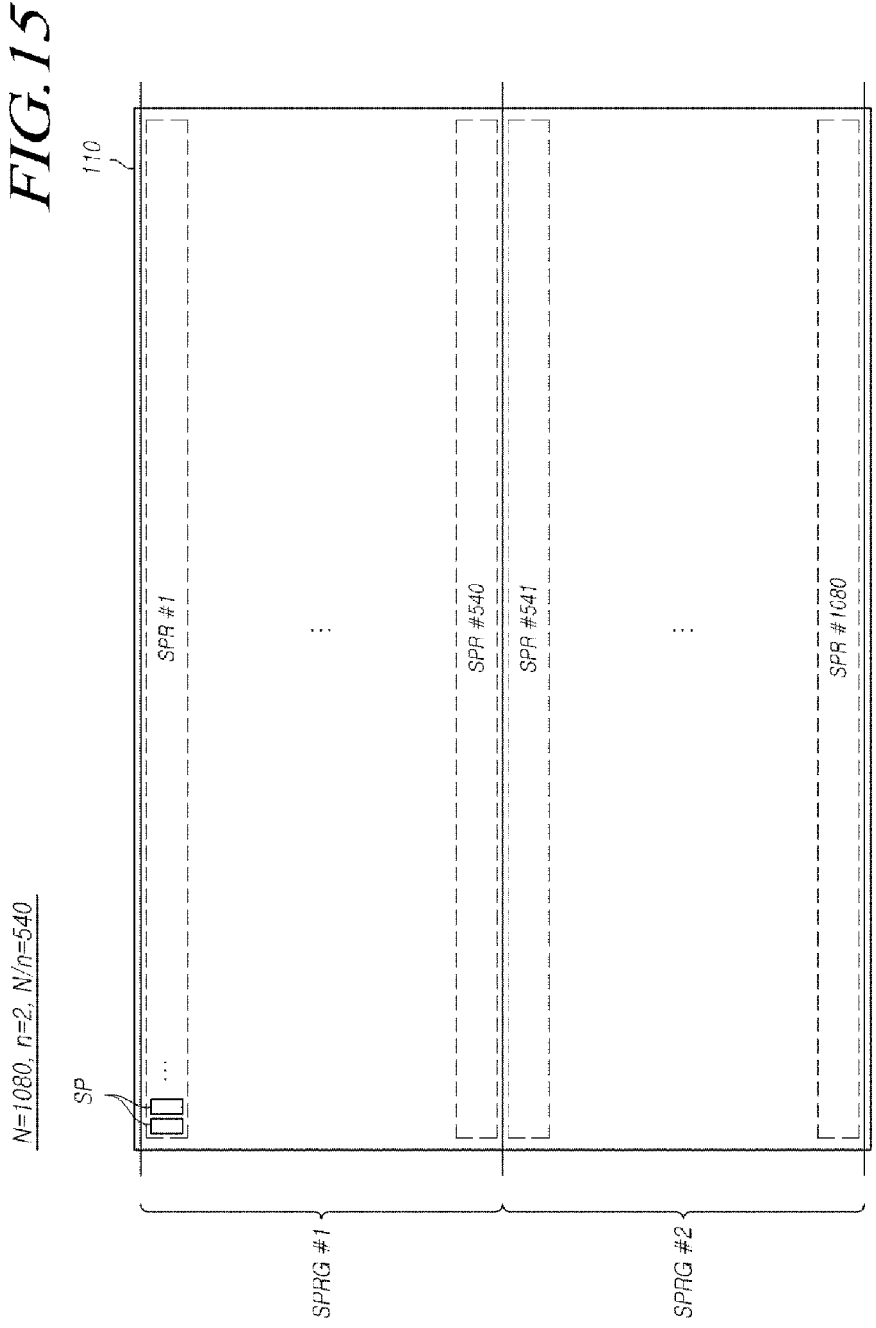

FIG. 14 and FIG. 15 are diagrams illustrating an example structure of the display panel 110 implementing an example of split screen display driving where n=2. As shown in FIG. 14, a display panel 110 designed to have full high-definition (FHD) 1920×1080 is taken as an example in order to illustrate an example split screen display driving when n is 2. In other words, although N=1080 and M=1920 in the illustrated example, N and M may have higher or lower values such that the present invention is applicable to display devices with higher or lower resolutions. In the illustrated example, 1920×1080 subpixels are disposed on the display panel 110. In other words, the display panel 110 may have, for example, 1920 subpixel rows SPC #1 to SPC #1920, and 1080 subpixel columns SPR #1 to SPR #1080.

As shown in FIG. 15, since n=2 in this example, the entire area of the screen is divided into two partial areas, and the number of subpixel row groups is 2. In addition, since N=1080, N/n corresponding to the number of subpixel rows within a single subpixel row group is 540. Thus, the subpixel row group SPRG #1 includes 540 (=1080/2) subpixel rows SPR #1 to SPR #540. The subpixel row group SPRG #2 includes the remaining 540 (=1080/2) subpixel rows SPR #541 to SPR #1080. As illustrated in FIG. 15, the subpixel row groups SPRG #1 and SPRG #2 respectively correspond to the two display driving mode sections DM #1 and DM #2.

In the example illustrated in FIG. 11, in which the subpixel rows are driven in the same sequence in the $i^{th}$ frame as in the $(i+1)^{th}$ frame, the subpixel row group SPRG #1 may correspond to the display driving mode section DM #1, and the subpixel row group SPRG #2 may correspond to the display driving mode section DM #2. In contrast, in the example illustrated in FIG. 12, in which the subpixel rows are driven in the $i^{th}$ frame in the reverse sequence as in the $(i+1)^{th}$ frame, the subpixel row group SPRG #2 may correspond to the display driving mode section DM #1, and the subpixel row group SPRG #1 may correspond to the display driving mode section DM #2 in every other frame.

With the structure of the display panel 110 illustrated in FIG. 14 and FIG. 15 as an example, the two types of split screen display driving is described below in more detail with reference to FIGS. 16 to 26.

Figure 16:
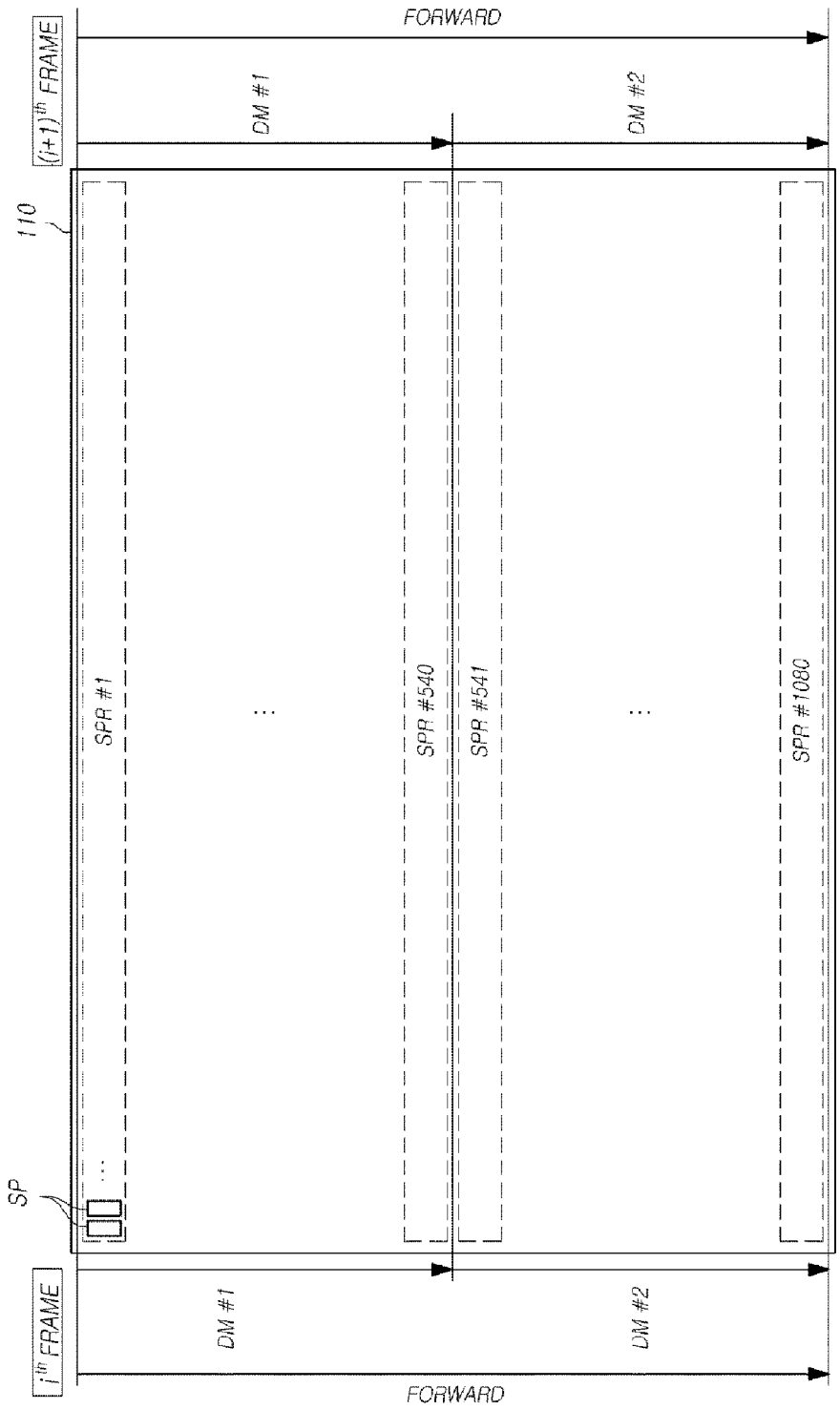
FIG. 16 is a diagram illustrating an example of split screen display driving, in which the driving sequences are the same for consecutive frames, in the touchscreen display device according to the example embodiments.
Figure 17:
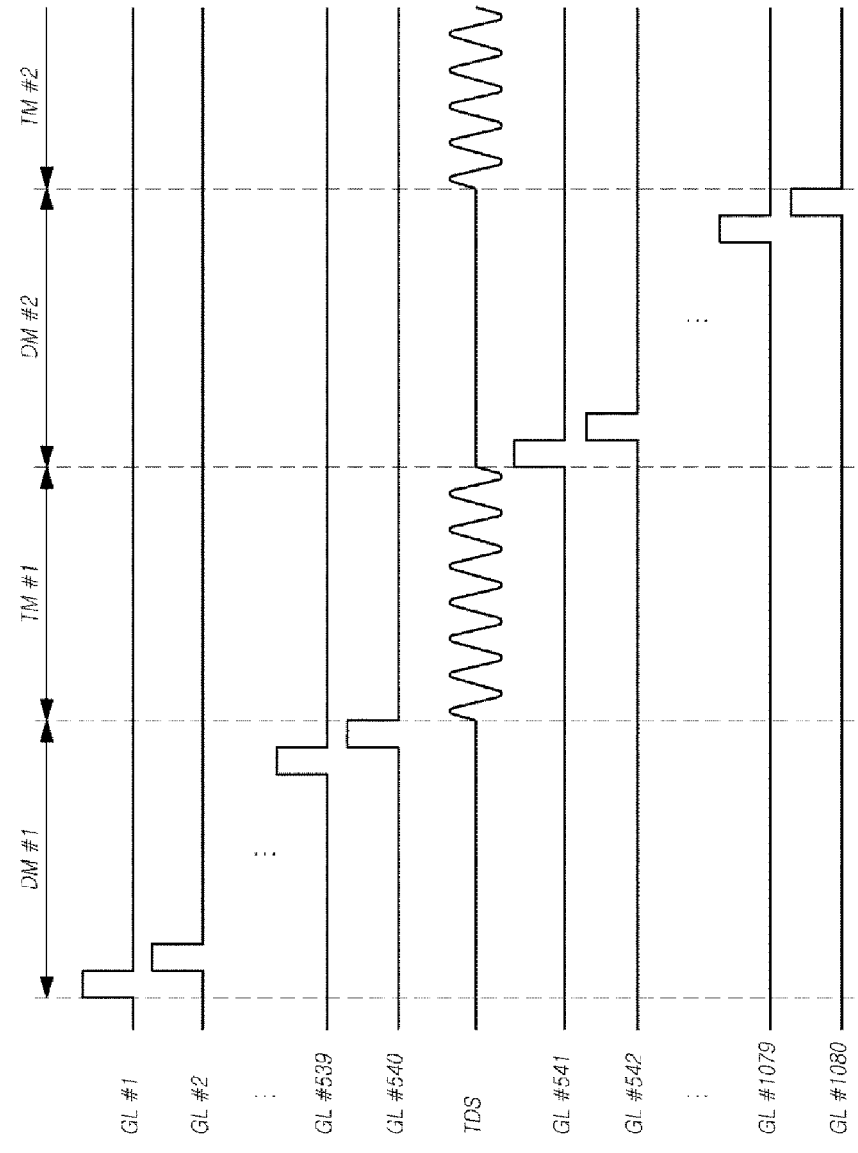
FIG. 17 and FIG. 18 are timing diagrams illustrating a scanning signal applied to the gate lines in two display driving mode sections and touch driving signals applied to a plurality of touch electrodes in two touch driving mode sections in an $i^{th}$ frame and an $(i+1)^{th}$ frame, respectively, when the example of split screen display driving in which the driving sequences are the same for consecutive frames is used in the touchscreen display device according to the example embodiments.
Figure 18:
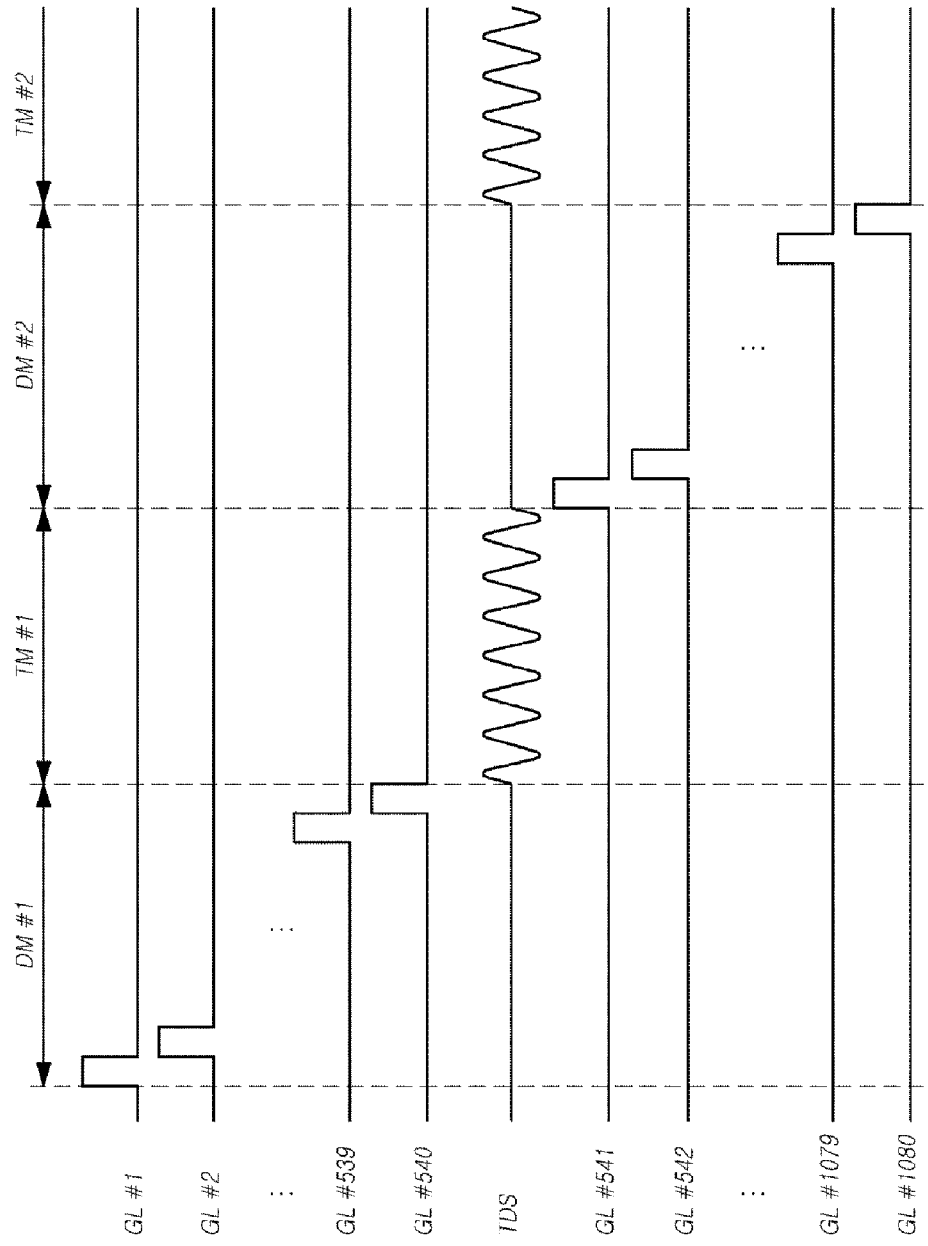

FIG. 16 is a diagram illustrating an example of split screen display driving, in which the driving sequence of the subpixel rows remains the same from frame to frame, in the touchscreen display device 100 according to the example embodiments. FIG. 17 and FIG. 18 are timing diagrams illustrating a scanning signal applied to the gate lines in two display driving mode sections and touch driving signals applied to the touch electrodes in two touch driving mode sections in the $i^{th}$ frame and the $(i+1)^{th}$ frame, respectively, when this example of split screen display driving is used in the touchscreen display device 100 according to the example embodiments.

As shown in FIG. 16, the sequence in which 1080 subpixel rows SPR #1 to SPR #1080 are driven in two display driving mode sections DM #1 and DM #2 in the $i^{th}$ frame is the same as the sequence in which the 1080 subpixel rows SPR #1 to SPR #1080 are driven in two display driving mode sections DM #1 and DM #2 in the $(i+1)^{th}$ frame. As shown in FIG. 16, the sequence in which the 1080 subpixel rows SPR #1 to SPR #1080 are driven in two display driving mode sections DM #1 and DM #2 in the $i^{th}$ frame is the forward sequence, which may be the same sequence in which the 1080 subpixel rows SPR #1 to SPR #1080 are driven in two display driving mode sections DM #1 and DM #2 in the $(i+1)^{th}$ frame.

As shown in FIG. 16 and FIG. 17, in the $i^{th}$ frame, the touchscreen display device 100 according to the example embodiments performs display driving by driving subpixel rows SPR #1 to SPR #540 included in the subpixel row group SPRG #1 sequentially by applying a scanning signal sequentially to 540 gate lines GL #1 to GL #540 disposed in the area corresponding to the subpixel row group SPRG #1 during the display driving mode section DM #1. Then, the touchscreen display device 100 performs touch driving by applying a touch driving signal TDS to the touch electrodes TE during the touch driving mode section TM #1.

Next, the touchscreen display device 100 performs display driving by driving subpixel rows SPR #541 to SPR #1080 included in the subpixel row group SPRG #2 sequentially by applying a scanning signal sequentially to 540 gate lines GL #541 to GL #1080 disposed in the subpixel row group SPRG #2 during the display driving mode section DM #2. Then, the touchscreen display device 100 performs touch driving by applying a touch driving signal TDS to the touch electrodes TE during the touch driving mode section TM #2.

As shown in FIG. 16 and FIG. 18, the touchscreen display device 100 may alternately perform display driving and touch driving twice in the $(i+1)^{th}$ frame in the same manner as in the $i^{th}$ frame.

Figure 19:
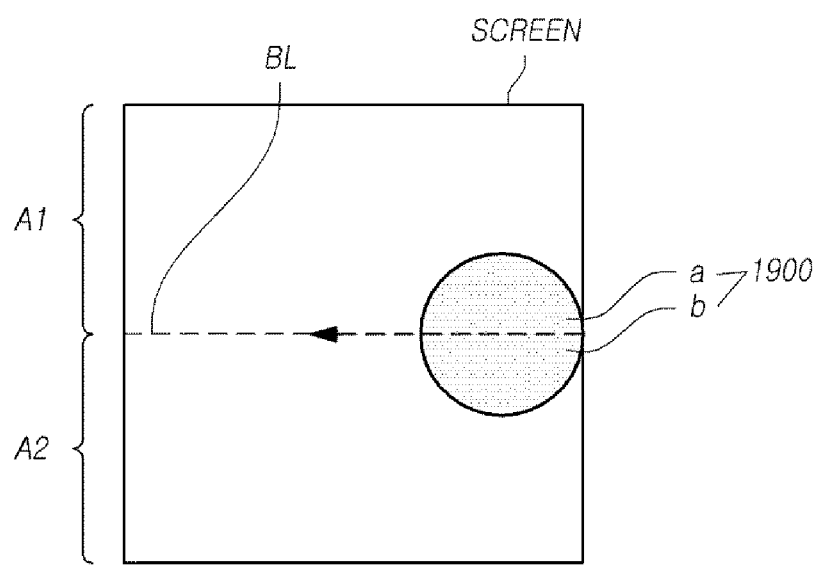
FIG. 19 illustrates an example video image to be displayed on the screen of the touchscreen display device according to the example embodiments.
Figure 20:
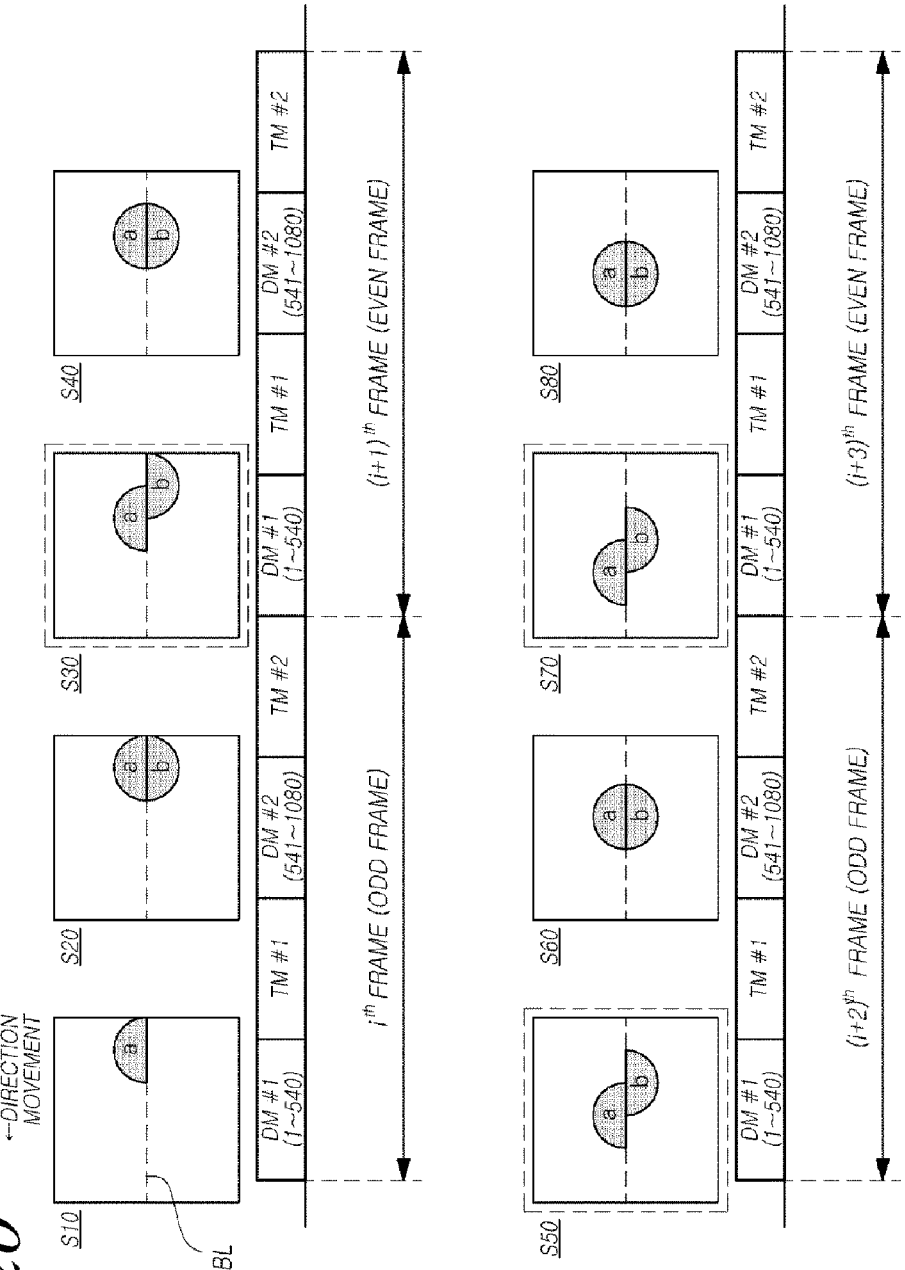
FIG. 20 is a diagram illustrating the example of split screen display driving to display the example video image of FIG. 19, in which example the driving sequences are the same for consecutive frames.
Figure 21:
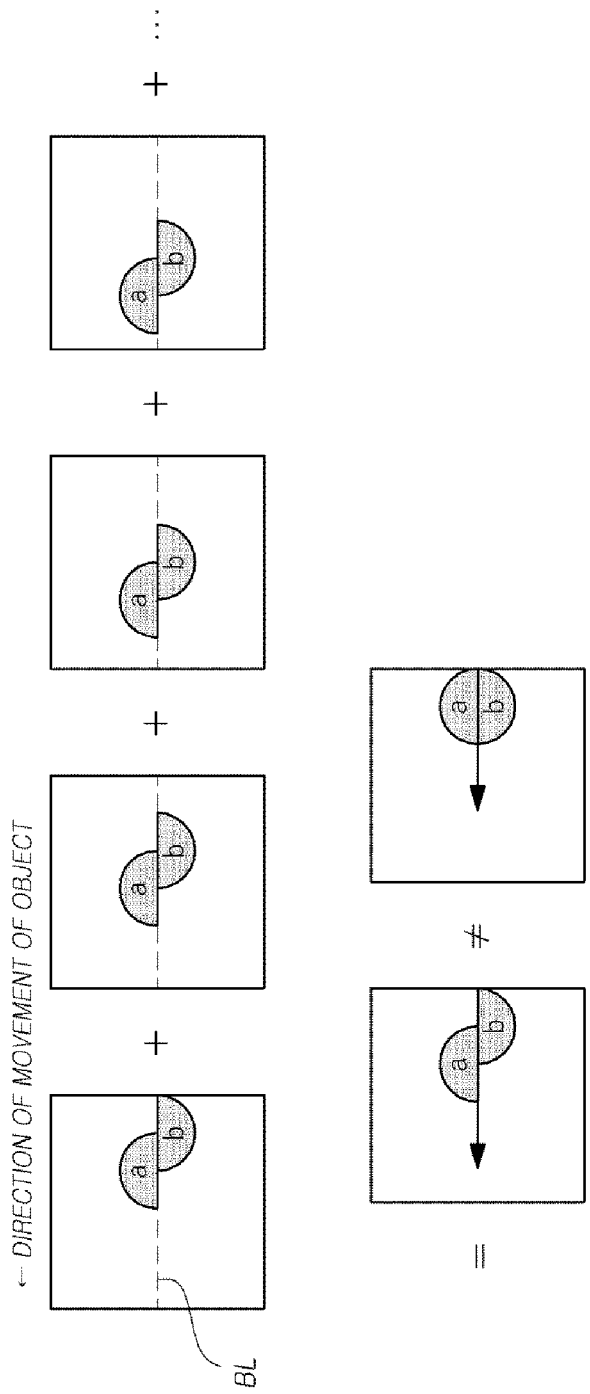
FIG. 21 is a diagram illustrating abnormalities in the video image that may be produced from split screen display driving of FIG. 20.

FIGS. 19 to 21 illustrate an example of displaying a video image of an object moving on the screen using split screen display driving described above with reference to FIGS. 16 to 18. With reference to FIGS. 19 to 21, possible abnormalities in a video image that may be caused by the example split screen display driving illustrated in FIGS. 16 to 18 are described below.

FIG. 19 schematically illustrates an example video image (an image of an object moving on the screen) that the touchscreen display device 100 is intended to display using the example split screen display driving described above with reference to FIGS. 16 to 18. As shown in FIG. 19, the screen is divided into two partial areas A1 and A2 by a boundary line BL. The area A1 is a split area corresponding to the subpixel row group SPRG #1, and is displayed during the display driving mode section DM #1. The area A2 is a split area corresponding to the subpixel row group SPRG #2, and is displayed during the display driving mode section DM #2. Also as shown in FIG. 19, an object 1900 to be displayed on the screen is divided into a first object part a to be displayed on the area A1 and a second object part b to be displayed on the area A2, which is divided from the area A1 by the boundary line BL.

FIG. 20 is a diagram illustrating the example of split screen display driving, in which the driving sequence of subpixel rows remains the same from frame to frame, to display the video image of FIG. 19. FIG. 21 is a diagram illustrating possible abnormalities in the video image produced from the example split screen display driving of FIG. 20.

As shown in FIG. 20, the $i^{th}$ frame, the $(i+1)^{th}$ frame, the $(i+2)^{th}$ frame, and the $(i+3)^{th}$ frame are displayed in sequence to display the moving object 1900 on the screen. As shown in FIG. 20, each of the frames consists of two display driving mode sections DM #1 and DM #2, and two touch driving mode sections TM #1 and TM #2.

As illustrated in FIG. 20, in the $i^{th}$ frame, display driving and touch driving are alternately performed. First, in S10, display driving is performed to display the first object part a by driving the subpixel row group SPRG #1 corresponding to the area A1 during the display driving mode section DM #1. Then, touch driving is performed during the touch driving mode section TM #1. Next, in S20, display driving is performed to display the second object part b by driving the subpixel row group SPRG #2 corresponding to the area A2 during the display driving mode section DM #2. Then, touch driving is performed during the touch driving mode section TM #2.

In the $(i+1)^{th}$ frame, display driving and touch driving are again alternately performed. First, in S30, display driving is performed to display the moving object 1900 by displacing the first object part a to the left by driving the subpixel row group SPRG #1 corresponding to the area A1 during the display driving mode section DM #1. At this time, the second object part b remains at the position displayed in S20. Then, touch driving is performed during the touch driving mode section TM #1. Next, in S40, display driving is performed to display the moving object 1900 by displacing the second object part b by driving the subpixel row group SPRG #2 corresponding to the area A2 during the display driving mode section DM #2. Then, touch driving is performed during the touch driving mode section TM #2.

In the $(i+2)^{th}$ frame, display driving and touch driving are again alternately performed. First, in S50, display driving is performed to display the moving object 1900 by further displacing the first object part a to the left by driving the subpixel row group SPRG #1 corresponding to the area A1 during the display driving mode section DM #1. At this time, the second object part b remains at the position displayed in S40. Then, touch driving is performed during the touch driving mode section TM #1. Next, in S60, display driving is performed to display the moving object 1900 by further displacing the second object part b by driving the subpixel row group SPRG #2 corresponding to the area A2 during the display driving mode section DM #2. Then, touch driving is performed during the touch driving mode section TM #2.

In the $(i+3)^{th}$ frame, display driving and touch driving are again alternately performed. First, in S70, display driving is performed to display the moving object 1900 by further displacing the first object part a to the left by driving the subpixel row group SPRG #1 corresponding to the area A1 during the display driving mode section DM #1. At this time, the second object part b remains at the position displayed in S60. Then, touch driving is performed during the touch driving mode section TM #1. Next, in S80, display driving is performed to display the moving object 1900 by further displacing the second object part b by driving the subpixel row group SPRG #2 corresponding to the area A2 during the display driving mode section DM #2. Then, touch driving is performed during the touch driving mode section TM #2.

As shown in FIG. 20, in S30, S50, and S70, since the first object part a and the second object part b of the moving object 1900 do not move together, abnormalities appear in the image of the object 1900. FIG. 21 collectively illustrates the stages in which the moving object 1900 is abnormally displayed on the screen. As shown in FIG. 21, since abnormalities in the image of the moving object 1900 appearing on the screen remain the same for a prolonged period of time, the user may visually recognize the abnormalities in the image of the moving object 1900. Although the abnormalities in the moving object 1900 are displayed on the screen in only some of the display driving mode sections, the same abnormalities in the video image are repeated for a prolonged period of time. Thus, the user may recognize an abnormal video image different from the actual video image.

Figure 22:
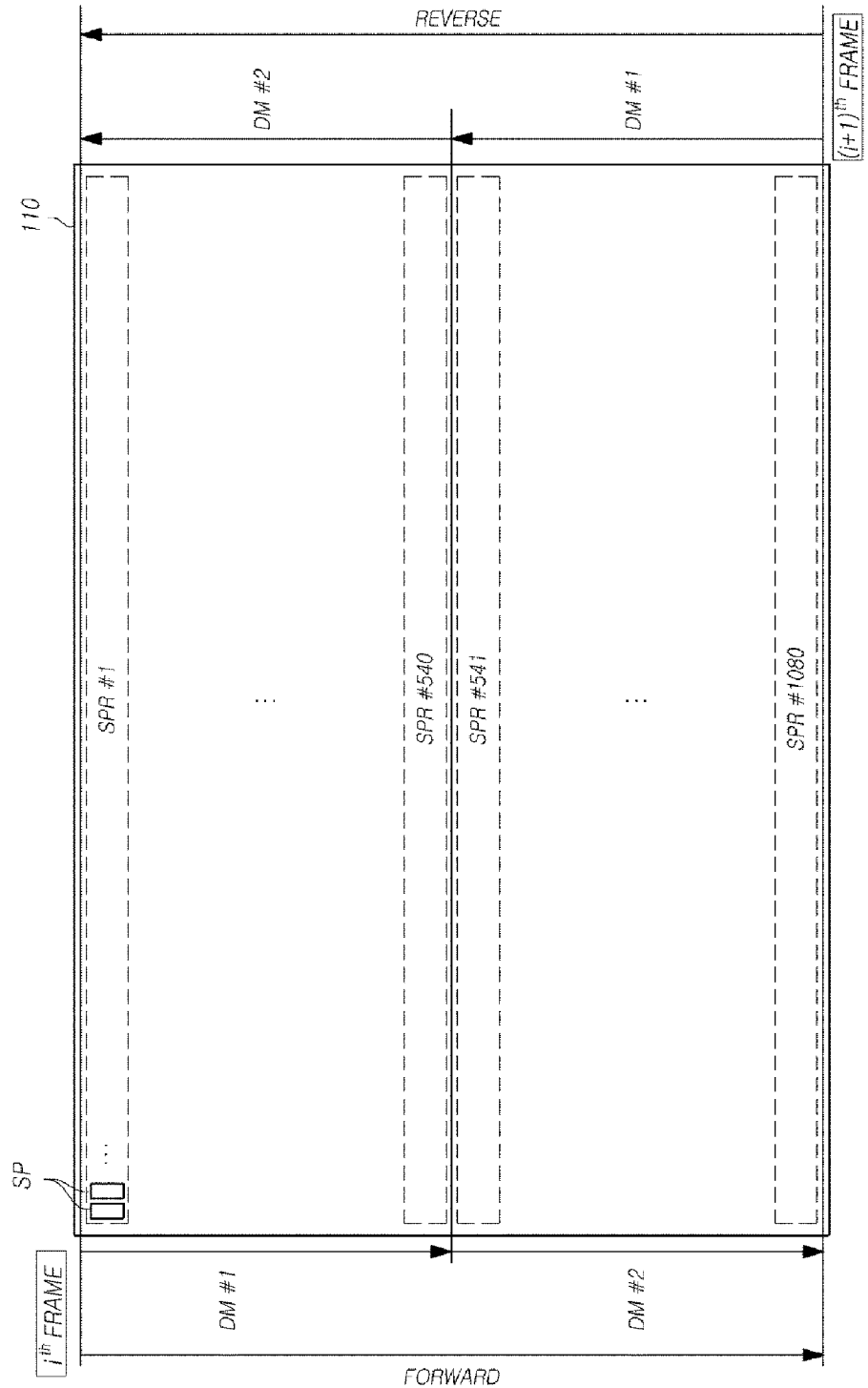
FIG. 22 is a diagram illustrating an example split screen display driving, in which the driving sequences may be different for two consecutive frames, in the touchscreen display device 100 according to the example embodiments.
Figure 23:
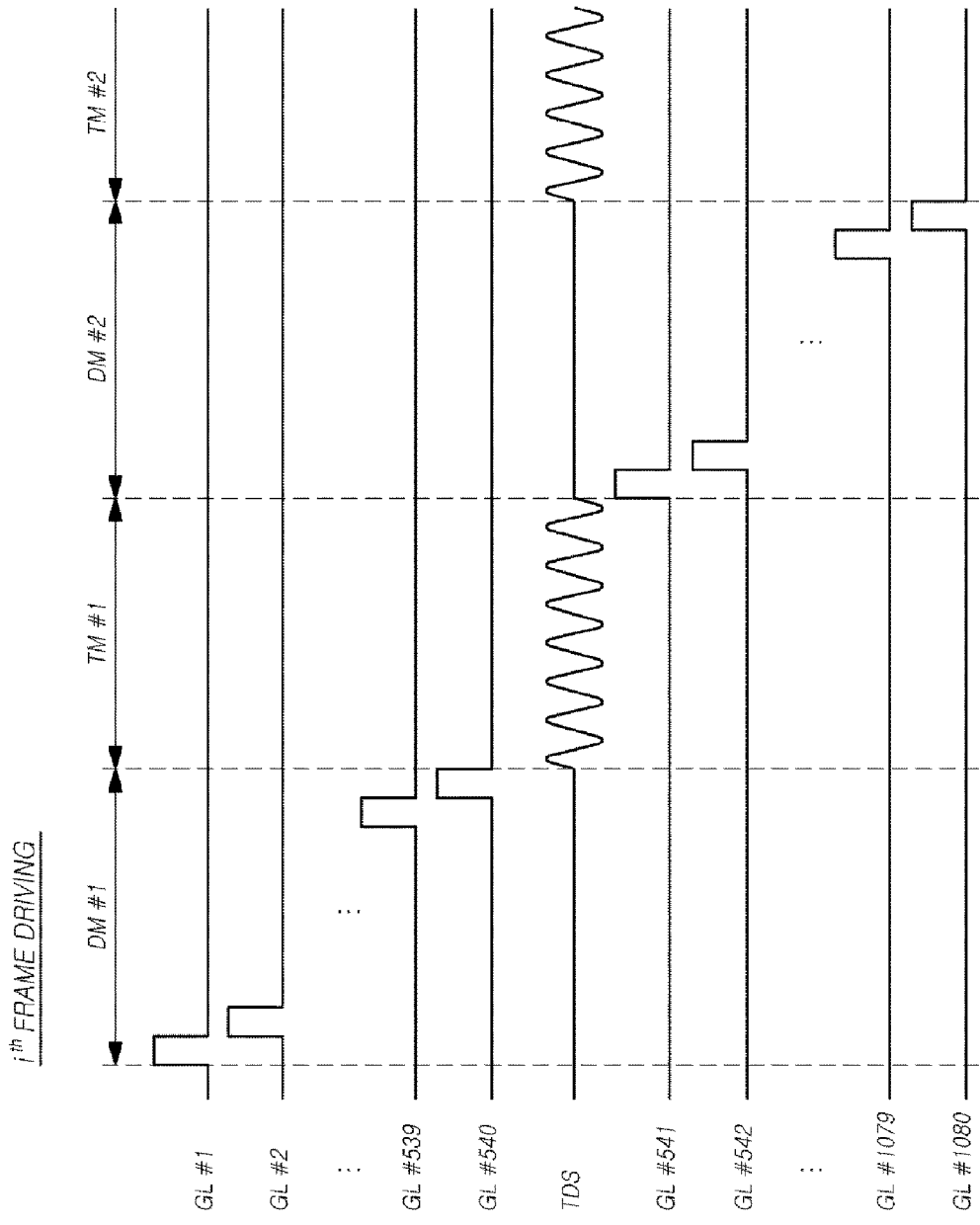
FIG. 23 and FIG. 24 are timing diagrams illustrating a scanning signal applied to the gate lines in two display driving mode sections and touch driving signals applied to the touch electrodes in two touch driving mode sections in the $i^{th}$ frame and the $(i+1)^{th}$ frame, respectively, when the example of split screen display driving in which the driving sequence may be different for two consecutive frames, in the touchscreen display device according to the example embodiments.
Figure 24:
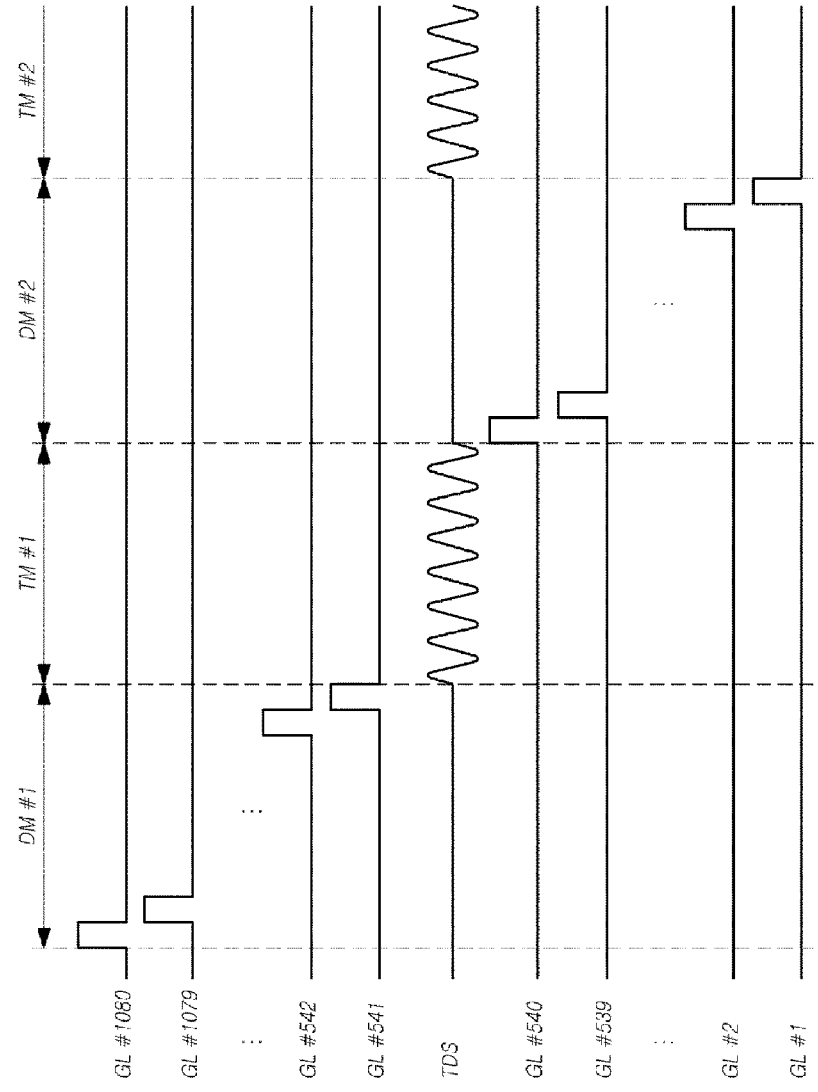

To prevent or mitigate the possible visual recognition of the abnormalities in the video image described above, the touchscreen display device 100 according to the example embodiments may employ another example of split screen display driving, in which driving sequences of the subpixel rows are different for two consecutive frames. FIG. 22 is a diagram illustrating this example split screen display driving in the touchscreen display device 100 according to the example embodiments. FIG. 23 and FIG. 24 are timing diagrams illustrating a scanning signal applied to the gate lines in two display driving mode sections and touch driving signals applied to the touch electrodes in two touch driving mode sections in the $i^{th}$ frame and in the $(i+1)^{th}$ frame, respectively, when this example split screen display driving is employed in the touchscreen display device 100 according to the example embodiments.

As shown in FIG. 22, the sequence in which 1080 subpixel rows SPR #1 to SPR #1080 are driven in two display driving mode sections DM #1 and DM #2 in the $i^{th}$ frame is the reverse of the sequence in which the 1080 subpixel rows SPR #1 to SPR #1080 are driven in two display driving mode sections DM #1 and DM #2 in the $(i+1)^{th}$ frame. In the $i^{th}$ frame, the 1080 subpixel rows SPR #1 to SPR #1080 may be driven in the forward sequence (SPR #1→SPR #2→ . . . →SPR #1079→SPR #1080) in display driving mode sections DM #1 and DM #2. However, in the $(i+1)^{th}$ frame, the 1080 subpixel rows SPR #1 to SPR #1080 are driven in the reverse sequence (SPR #1080→SPR #1079→ . . . →SPR #2→SPR #1) in two display driving mode sections DM #1 and DM #2.

As shown in FIG. 22 and FIG. 23, in the $i^{th}$ frame, the touchscreen display device 100 performs display driving by driving the subpixel rows SPR #1 to SPR #540 sequentially by applying a scanning signal sequentially to 540 gate lines GL #1 to GL #540 disposed in the area corresponding to the subpixel row group SPRG #1 using the gate driver 130 during the display driving mode section DM #1. Then, during the touch driving mode section TM #1, the touchscreen display device 100 performs touch driving by applying a touch driving signal TDS to the touch electrodes TE using the touch driver 160.

Next, during the display driving mode section DM #2, the touchscreen display device 100 performs display driving by driving the subpixel rows SPR #541 to SPR #1080 of the subpixel row group SPRG #2 sequentially by applying a scanning signal sequentially to 540 gate lines GL #541 to GL #1080 disposed in the area corresponding to the subpixel row group SPRG #2 using the gate driver 130. Then, during the touch driving mode section TM #2, the touchscreen display device 100 performs touch driving by using the touch driver 160 to apply a touch driving signal TDS to the touch electrodes TE.

As shown in FIG. 22 and FIG. 24, during the display driving mode section DM #1 in the (i+1)$^{th}$ frame following to the i$^{th}$ frame, the touchscreen display device 100 performs display driving by driving the subpixel rows SPR #1080, SPR #1079, SPR #542, and SPR #541 of the subpixel row group SPRG #2 sequentially by applying a scanning signal sequentially to 540 gate lines GL #1080, GL #1079, GL #542, and GL #541 disposed on the area corresponding to the subpixel row group SPRG #2 in the reverse sequence (GL #1080→GL #1079→ . . . →GL #542→GL #541) using the gate driver 130. Then, in the touch driving mode section TM #1, the touchscreen display device 100 performs touch driving by using the touch driver 160 to apply a touch driving signal TDS to the touch electrodes TE.

Next, during the display driving mode section DM #2, the touchscreen display device 100 performs display driving by driving the subpixel rows SPR #540, SPR #539, SPR #2, and SPR #1 of the subpixel row group SPRG #1 sequentially by applying a scanning signal sequentially to 540 gate lines GL #540, GL #539, GL #2, and GL #1 disposed in the area corresponding to the subpixel row group SPRG #1 in the reverse sequence (GL #540→GL #539→ . . . →GL #2→GL #1) using the gate driver 130. Then, during the touch driving mode section TM #2, the touchscreen display device 100 performs touch driving by using the touch driver 160 to apply a touch driving signal TDS to the touch electrodes TE.

Figure 25:
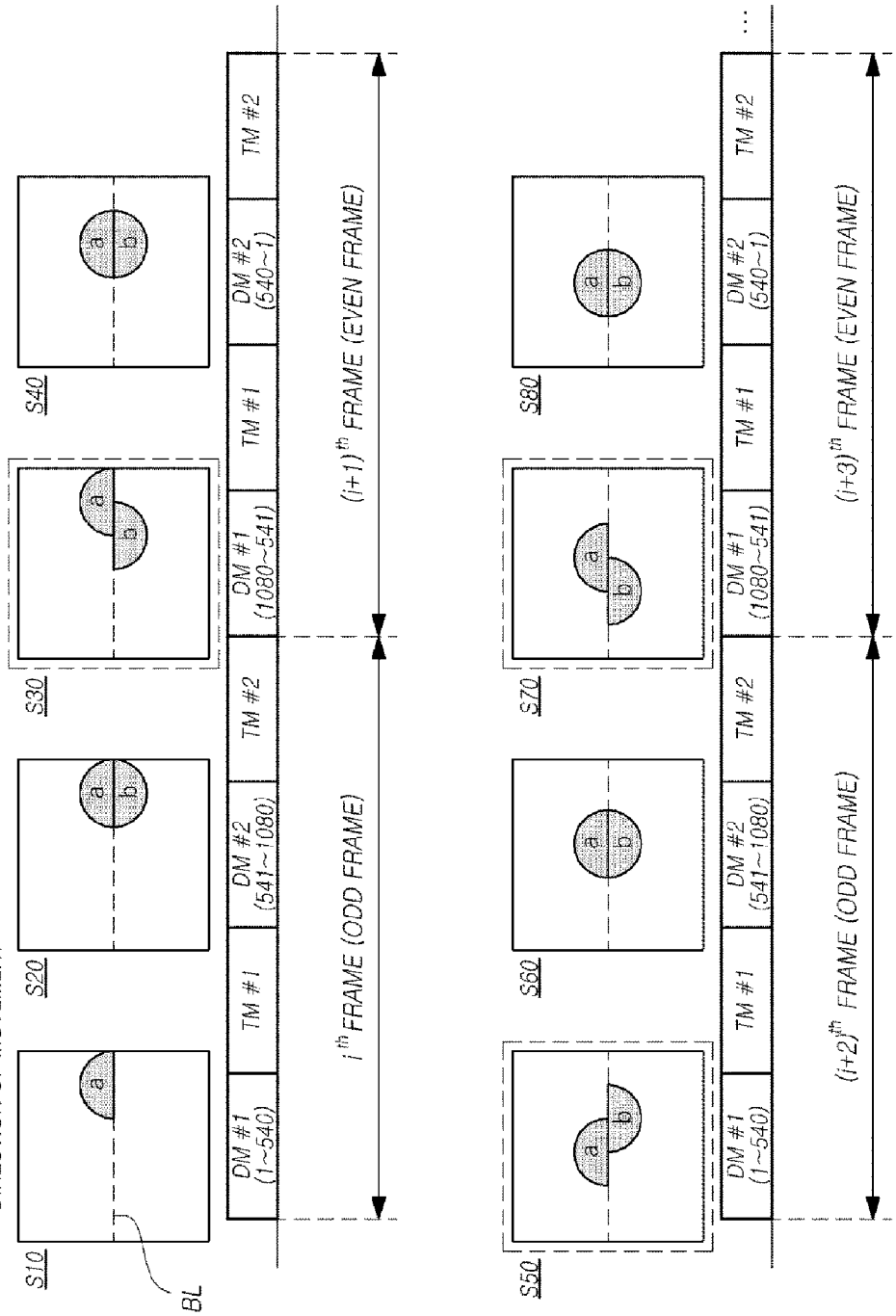
FIG. 25 is a diagram illustrating the example of split screen display driving to display the example video image of FIG. 19, in which example the driving sequences may be different for two consecutive frames.
Figure 26:
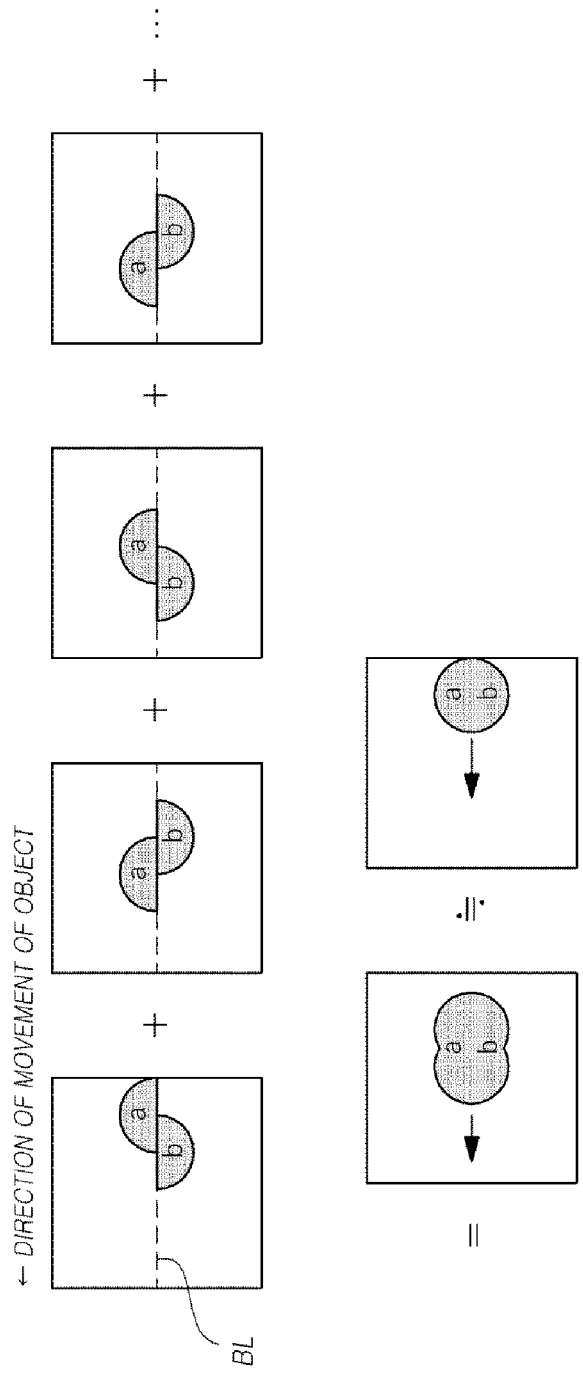
FIG. 26 is a diagram illustrating example effect of preventing or mitigating abnormalities in the video image obtained from split screen display driving of FIG. 25.

FIG. 25 is a diagram illustrating the example split screen display driving, in which driving sequences of the subpixel rows are different for two consecutive frames, to display the video image of FIG. 19. FIG. 26 is a diagram illustrating the effect of preventing or mitigating abnormalities in the video image obtained from the example split screen display driving of FIG. 25.

As illustrated in FIG. 25, the i$^{th}$ frame, the (i+1)$^{th}$ frame, the (i+2)$^{th}$ frame, and the (i+3)$^{th}$ frame are displayed in sequence to display a moving object 1900 on the screen. As shown in FIG. 25, each of the frames consists of two display driving mode sections DM #1 and DM #2, and two touch driving mode sections TM #1 and TM #2.

As shown in FIG. 25, in the i$^{th}$ frame, display driving and touch driving are alternately performed. First, in S10, display driving is performed to display the first object part a by driving the subpixel row group SPRG #1 corresponding to the area A1 during the display driving mode section DM #1. Then, touch driving is performed during the touch driving mode section TM #1. Next, in S20, display driving is performed to display the second object part b by driving the subpixel row group SPRG #2 corresponding to the area A2 during the display driving mode section DM #2. Then, touch driving is performed during the touch driving mode section TM #2.

As shown in FIG. 25, in the (i+1)$^{th}$ frame (i.e., a frame in which driving of the subpixel rows is performed in the reverse sequence), display driving and touch driving are alternately performed. First, in S30, display driving is performed to display the moving object by displacing the second object part b to the left by driving the subpixel row group SPRG #2 corresponding to the area A2 during display driving mode section DM #1. At this time, the first object part a remains at the position displayed in S20. Then, touch driving is performed during the touch driving mode section TM #1. Next, in S40, display driving is performed to display the moving object by displacing the first object part a to the left by driving the subpixel row group SPRG #1 corresponding to the area A1 during the display driving mode section DM #2. Then, touch driving is performed during the touch driving mode section TM #2.

As shown in FIG. 25, in the (i+2)$^{th}$ frame, display driving and touch driving are again alternately performed. In S50, display driving is performed to display the moving object by further displacing the first object part a to the left by driving the subpixel row group SPRG #1 corresponding to the area A1 during the display driving mode section DM #1. At this time, the second object part b remains at the position displayed in S40. Then, touch driving is performed during the touch driving mode section TM #1. Next, in S60, display driving is performed to display the moving object by further displacing the second object part b by driving the subpixel row group SPRG #2 corresponding to the area A2 during the display driving mode section DM #2. Then, touch driving is performed during the touch driving mode section TM #2.

As shown in FIG. 25, in the (i+3)$^{th}$ frame (i.e., another frame in which driving is performed in the reverse sequence), in S70, display driving is performed to display the moving object by further displacing the second object part b to the left by driving the subpixel row group SPRG #2 corresponding to the area A2 during display driving mode section DM #1. At this time, the first object part a remains at the position displayed in S60. Then, touch driving is performed during the touch driving mode section TM #1. Next, in S80, display driving is performed to display the moving object by further displacing the first object part a to the left by driving the subpixel row group SPRG #1 corresponding to the area A1 during the display driving mode section DM #2. Then, touch driving is performed during the touch driving mode section TM #2.

As illustrated in FIG. 25, in S30, S50, and S70, the first object part a and the second object part b of the moving object 1900 do not move together, and abnormalities appear in the image. However, as shown in FIG. 25 as well as FIG. 26 (illustrating a collection of the stages S30, S50, and S70 in which the object 1900 is abnormally displayed on the screen), different abnormalities in the image of the moving object 1900 are displayed on the screen such that the same abnormalities are not repeated for consecutive frames for a prolonged period of time.

Specifically, the image in which the second object part b is located to the left of the first object part a and the image in which the first object part a is positioned to the left of the second object part b are alternately displayed. In this manner, the abnormalities in the image of the moving object 1900 may be offset, such that the user may recognize the image of the moving object 1900 to be substantially normal. In other words, any abnormality in the image of the moving object 1900 having the same shape is not repeated for a prolonged period of time, but abnormalities in the image of the moving object 1900 having different shapes may offset each other such that the user does not visually recognize the abnormalities.

According to the above-described split screen display driving having different driving sequences for consecutive frames, even if an abnormal image different from an actual video image is temporarily displayed, the user may not recognize the abnormality and instead may recognize the abnormal image as being substantially normal.

The touch driver 160 of the touchscreen display device 100 according to the example embodiments may be included in the data driver 120 or may be integrated with the data driver 120. Specifically, the touch driver 160 may be included in each of source driver ICs of the data driver 120, or in some cases, one or more touch drivers 160 may be integrated with one or more source driver ICs. This example is illustrated in FIG. 27.

Figure 27:
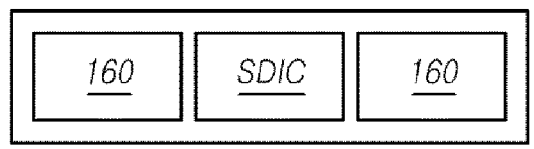
FIG. 27 illustrates an example touch driver of the touchscreen display device according to the example embodiments.

FIG. 27 illustrates an example touch driver 160 of the touchscreen display device 100 according to an example embodiment. As shown in FIG. 27, the touchscreen display device 100 according to the example embodiments may include an integrated driver 2700 in which two touch drivers 160 are integrated with each source driver IC SDIC of the data driver 120.

As described above, the touch driver 160 can be included in the data driver 120 or can be integrated with the data driver 120, thereby reducing the number of component parts in the touchscreen display device 100. In addition, if the touch driver 160 is included in the data driver 120 or is integrated with the data driver 120, it may be easier to apply alternately both a common voltage Vcom and a touch driving signal TDS to the touch electrodes TE. In other words, it may be easier to use the common electrodes as the touch electrodes TE. Consequently, the touchscreen display device 100 including the display panel 110 and the touch panel 150 according to the above example embodiments can be efficiently implemented, and can efficiently provide both display driving and touch driving.

According to the example embodiments as described above, the touchscreen display device 100 and the method of driving the same can effectively prevent or mitigate abnormalities in video images at boundary lines when the entire area of the screen is divided into a plurality of partial areas as a single frame is divided into two or more display driving mode sections and one or more touch driving mode sections each interposed between the display driving mode sections.

According to the example embodiments as described above, the touchscreen display device 100 and the method of driving the same can effectively prevent a user from visually recognizing abnormalities in video images by preventing the same abnormality in a video image from repeatedly appearing for a prolonged period when the entire area of the screen is divided into a plurality of partial areas as a single frame is divided into two or more display driving mode sections and one or more touch driving mode sections each interposed between the display driving mode sections.

It will be apparent to those skilled in the art that various modifications and variations can be made in the touchscreen display device and the method of driving the same according to the present invention and the example embodiments without departing from the spirit or scope of the invention. Thus, it is intended that the present invention cover the modifications and variations of this invention and the example embodiments provided they come within the scope of the appended claims and their equivalents.

What is claimed is:

1. A touchscreen display device, comprising:
a display panel comprising a plurality of touch electrodes, a plurality of data lines, a plurality of gate lines, and N×M subpixels arranged in a matrix having N subpixel rows and M subpixel columns, and respectively connected to the corresponding data lines and the corresponding gate lines, wherein N and M are each a natural number greater than or equal to 2, and the N subpixel rows are divided into at least a first subpixel row group and a second subpixel row group adjacent to the first subpixel row group;
a data driver configured to provide data voltages to the data lines in a display driving mode;
a gate driver configured to provide a scanning signal to the gate lines in the display driving mode; and
a touch driver configured to provide a touch driving signal to at least one of the plurality of touch electrodes in a touch driving mode,
wherein each of an $i^{th}$ frame and an $(i+1)^{th}$ frame is configured to include at least two display driving mode sections alternating with at least one touch driving mode section, where i is a positive integer, and the gate driver is configured to provide the scanning signal to the gate lines connected to the first subpixel row group during one of the at least two display driving mode section and to the gate lines connected to the second subpixel row group during another of the at least two display driving mode, and
wherein the gate driver is configured to provide the scanning signal to the gate lines connected to the N subpixel rows in a first sequence during the at least two display driving mode sections of the $i^{th}$ frame and in a second sequence different from the first sequence during the at least two display driving mode section of the $(i+1)^{th}$ frame to mitigate an abnormal appearance of a moving object displayed at a boundary between the first subpixel row group and the second subpixel row group caused by the division of the N subpixel rows into at least the first subpixel row group and the second subpixel row group.

2. The touchscreen display device according to claim 1, wherein the N subpixel rows are divided into the first to an n-th subpixel row groups driven in temporally separated display driving mode sections, where n is a natural number greater than or equal to 2 and smaller than N, and
wherein each of the $i^{th}$ frame and the $(i+1)^{th}$ frame has a first to an n-th display driving mode sections alternating with the at least one touch driving mode section.

3. The touchscreen display device according to claim 2, wherein each of the $i^{th}$ frame and the $(i+1)^{th}$ frame has n touch driving mode sections alternating with the n display driving mode sections.

4. The touchscreen display device according to claim 2, wherein each of the n subpixel row groups includes N/n subpixel rows, and
wherein the gate driver is configured to provide the scanning signal to the n subpixel row groups in the first sequence during the $i^{th}$ frame and in the second sequence during the $(i+1)^{th}$ frame.

5. The touchscreen display device according to claim 2, wherein:
during the $i^{th}$ frame, the first subpixel row group is driven during the first display driving mode section, and the n-th subpixel row group is driven during the n-th display driving mode section, and
during the $(i+1)^{th}$ frame, the n-th subpixel row group is driven during the first display driving mode section, and the first subpixel row group is driven during the n-th display driving mode section.

6. The touchscreen display device according to claim 1, wherein the second sequence is the reverse of the first sequence.

7. The touchscreen display device according to claim 6, wherein the first sequence is a forward sequence from a first subpixel row to an N-th subpixel row.

8. The touchscreen display device according to claim 1, wherein the display panel comprises the touch electrodes and a plurality of signal lines electrically connecting the touch electrodes to the touch driver.

9. The touchscreen display device according to claim 8, wherein the touch electrodes are configured to serve as common electrodes to which a common voltage is applied in the display driving mode.

10. The touchscreen display device according to claim 1, wherein the touch driver is integrated into the data driver.

11. The touchscreen display device according to claim 1, wherein, during the touch driving mode, a load-free driving signal for attenuating parasitic capacitances is configured to be provided to one or more of the following: at least one of the data lines by the data driver, at least one of the gate lines by the gate driver, and at least one of the touch electrodes to which the touch driving signal is not applied by the touch driver, and wherein the load-free driving signal corresponds to the touch driving signal.

12. A method of driving a touchscreen display device comprising a display panel having a plurality of data lines, a plurality of gate lines, a plurality of touch electrodes, and N×M subpixels arranged in a matrix consisting of N subpixel rows and M subpixel columns and respectively connected to the corresponding data lines and the corresponding gate lines, wherein N and M are each a natural number greater than or equal to 2, and the N subpixel rows are divided into at least a first subpixel row group and a second subpixel row group adjacent to the first subpixel row group, the method comprising:

applying the scanning signal to the gate lines connected to the N subpixel rows in a first sequence during at least two display driving mode sections of an $i^{th}$ frame, the $i^{th}$ frame being configured to include the at least two display driving mode sections alternating with at least one touch driving mode section, where i is a positive integer;

applying the touch driving signal to at least one of the touch electrodes during the at least one touch driving mode section of the $i^{th}$ frame;

applying the scanning signal to the gate lines connected to the N subpixel rows in a second sequence different from the first sequence during the at least two display driving mode sections of an $(i+1)^{th}$ frame to mitigate an abnormal appearance of a moving object displayed at a boundary between the first subpixel row group and the second subpixel row group caused by the division of the N subpixel rows into at least the first subpixel row group and the second subpixel row group, the $(i+1)^{th}$ frame being configured to include the at least two display driving mode sections alternating with at least one touch driving mode section; and applying the touch driving signal to at least one of the touch electrodes disposed on the display panel during the at least one touch driving mode section of the $(i+1)^{th}$ frame.

13. The method of claim 12, wherein the N subpixel rows are divided into a first to an n-th subpixel row groups driven in temporally separated display driving mode sections, where n is a natural number greater than or equal to 2 and smaller than N, and wherein each of the $i^{th}$ frame and the $(i+1)^{th}$ frame has a first to an n-th display driving mode sections alternating with the at least one touch driving mode section.

14. The method of claim 13, wherein each of the $i^{th}$ frame and the $(i+1)^{th}$ frame has n touch driving mode sections alternating with the n display driving mode sections.

15. The method of claim 13, wherein the applying of the scanning signal during the $i^{th}$ frame includes:

applying the scanning signal to the first subpixel row group during the first display driving mode section; and applying the scanning signal to the n-th subpixel row group during the n-th display driving mode section, and wherein the applying of the scanning signal during the $(i+1)^{th}$ frame includes:

applying the scanning signal to the n-th subpixel row group during the first display driving mode section; and applying the scanning signal to the first subpixel row group during the n-th display driving mode section.

16. The method of claim 15, wherein the applying of the touch driving signal includes applying the touch driving signal to the at least one of the touch electrodes between the applying of the scanning signal to the first subpixel row group and the applying of the scanning signal to the n-th subpixel row group during the $i^{th}$ frame.

17. The method of claim 12, wherein the second sequence is the reverse of the first sequence.

18. The method of claim 17, wherein the first sequence is a forward sequence from a first subpixel row to an N-th subpixel row.

19. The method of claim 12, further comprising:

applying a load-free driving signal for attenuating parasitic capacitances to one or more of the following: at least one of the data lines, at least one of the gate lines, and at least one of the touch electrodes to which the touch driving signal is not applied, wherein the load-free driving signal corresponds to the touch driving signal.

20. The touchscreen display device according to claim 11, wherein the load-free driving signal has a same phase as the touch driving signal.

* * * * *